US007883016B2

(12) United States Patent
Kurokawa

(10) Patent No.: US 7,883,016 B2
(45) Date of Patent: Feb. 8, 2011

(54) IMAGE FORMING APPARATUS

(75) Inventor: Keiko Kurokawa, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/081,607

(22) Filed: Apr. 17, 2008

(65) Prior Publication Data

US 2008/0257950 A1 Oct. 23, 2008

(30) Foreign Application Priority Data

Apr. 17, 2007 (JP) ............................ 2007-107810
Apr. 3, 2008 (JP) ............................ 2008-096983

(51) Int. Cl.
*G06K 19/00* (2006.01)

(52) U.S. Cl. .................... 235/487; 235/489; 400/109.1; 434/112; 434/113; 434/114

(58) Field of Classification Search ................. 235/375, 235/487, 489; 400/109.1; 434/112, 113, 434/114
See application file for complete search history.

(56) References Cited

U.S. PATENT DOCUMENTS

| | | | | |
|---|---|---|---|---|
| 2,442,970 | A * | 6/1948 | Carroll et al. | 235/433 |
| 3,938,436 | A * | 2/1976 | Woodhouse | 101/18 |
| 6,561,091 | B1 * | 5/2003 | Steve | 101/212 |
| 2004/0091842 | A1 * | 5/2004 | Carro | 434/112 |
| 2005/0129284 | A1 * | 6/2005 | Campbell | 382/114 |

FOREIGN PATENT DOCUMENTS

| | | | |
|---|---|---|---|
| GB | 2185144 | * | 7/1987 |
| JP | A-09-218547 | | 8/1997 |
| JP | B2-2810048 | | 10/1998 |
| JP | A-2000-214640 | | 8/2000 |
| JP | A-2000-276016 | | 10/2000 |
| JP | B2-3332602 | | 10/2002 |

* cited by examiner

*Primary Examiner*—Seung H Lee
*Assistant Examiner*—Christopher Stanford
(74) *Attorney, Agent, or Firm*—Oliff & Berridge, PLC

(57) ABSTRACT

An image forming apparatus includes: an image forming unit; and an identification mark imparting unit that imparts an identification mark which is identifiable by a sense of touch on the recording paper on which an image is formed by the image forming unit.

15 Claims, 19 Drawing Sheets

BOTH-SIDE PRINTING PROCESSING (S10)

PRINTING PROCESSING (S20)

PRINTING PROCESSING (S40)

IMAGE FORMING APPARATUS

CROSS-REFERENCE TO RELATED APPLICATIONS

This application is based on and claims priority under 35 USC 119 from Japanese Patent Application No. 2007-107810 filed Apr. 17, 2007 and Japanese Patent Application No. 2008-096983 filed Apr. 3, 2008.

BACKGROUND

1. Technical Field

The present invention relates to an image forming apparatus such as a printer, a copy machine or a facsimile.

2. Related Art

Recently, from a viewpoint of enhancement of social welfare, there has been a demand for office equipment such as an image forming apparatus which can be easily handled even by a handicapped person. For example, in the United States, with respect to products which the federal government procures and uses, there is an obligation that handicapped government stuffs and civilians can get access to the products in the same manner as people having no handicaps (United States Rehabilitation Law, Section 508).

SUMMARY

According to an aspect of the invention, there is provided an image forming apparatus which includes an image forming unit, and an identification mark imparting unit that imparts an identification mark which is identifiable by a sense of touch on recording paper on which an image is formed by the image forming unit.

BRIEF DESCRIPTION OF THE DRAWINGS

First exemplary embodiments of the present invention will be described in detail based on the following figures, wherein:

FIGS. 2A and 2B show the peripheral structure of an identification mark imparting device according to the first exemplary embodiment of the present invention, wherein FIG. 2A is a front view of the identification mark imparting device, and FIG. 2B is a side view of the identification mark imparting device;

FIGS. 13A and 13B are views showing the structure of a first modification of an identification mark imparting unit used in the first exemplary embodiment of the present invention, wherein FIG. 13A is a side view and FIG. 13B is a perspective view;

DETAILED DESCRIPTION

Next, exemplary embodiments of the present invention are explained in conjunction with drawings.

Figure 1:
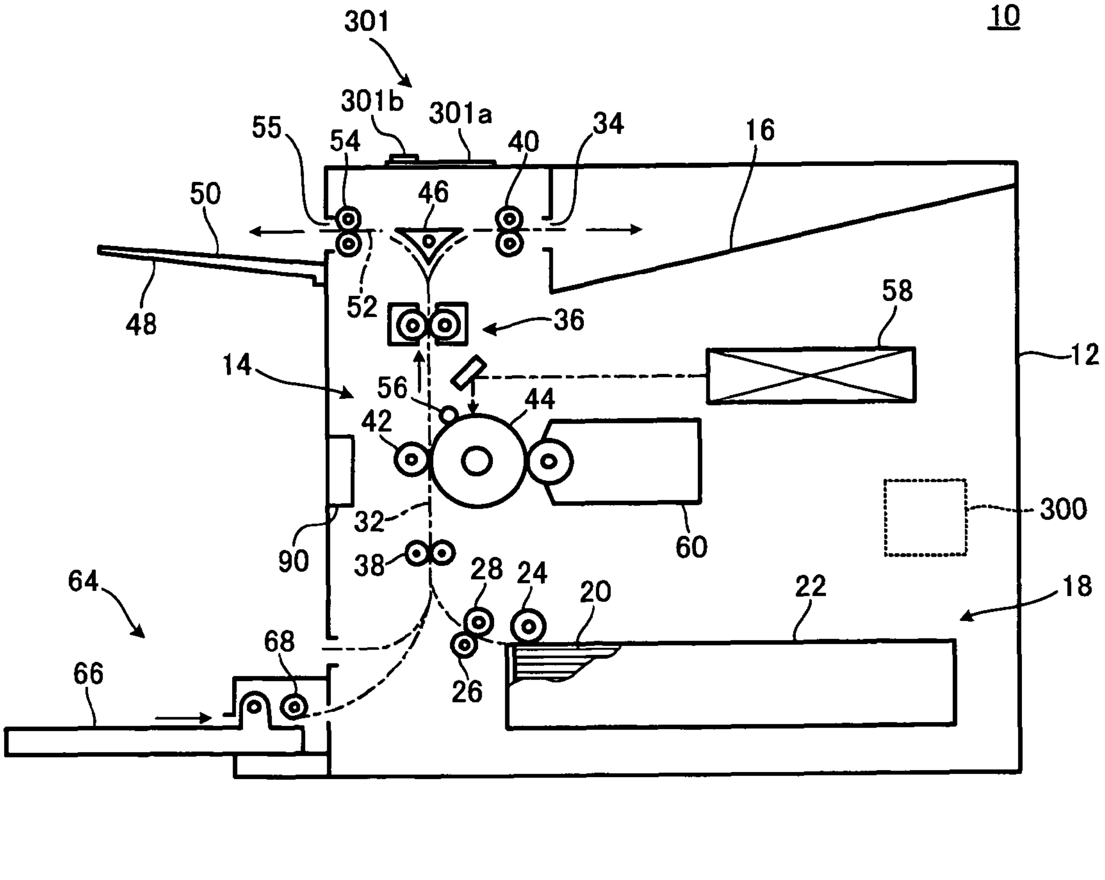
FIG. 1 is a side view showing an image forming apparatus according to a first exemplary embodiment of the present invention.

FIG. 1 shows the schematic constitution of an image forming apparatus 10 according to the exemplary embodiment of the present invention. The image forming apparatus 10 includes an image forming apparatus body 12. An image forming unit 14 is arranged in the image forming apparatus body 12. A first paper discharging part 16 described later is disposed in an upper portion of the image forming apparatus body 12 and a paper feeder 18 is arranged on a lower portion of the image forming apparatus body 12.

The paper feeder 18 includes a paper feeding cassette 22 in which sheets of paper 20 used as recording paper are accommodated by stacking. A pick-up roller 24 is arranged above and in the vicinity of a deep end of the paper feeding cassette 22, and a retarding roller 26 constituted of a sorting member and a feeding roller 28 constituted of a conveyance member are arranged upstream of the pick-up roller 24 in the paper conveying direction.

A main conveyance path 32 is a paper path from the feeding roller 28 to a first discharge port 34. The main conveyance path 32 is arranged in the vicinity of a front side (a left side in FIG. 1) of the image forming apparatus body 12 and includes a substantially-vertically-formed portion extending from the paper feeder 18 arranged at a lowermost end of the image forming apparatus body 12 to a fixing device 36 described later. A transfer device 42 and an image holder 44 described later are arranged upstream of the fixing device 36 of the main conveyance path 32 in the paper conveying direction. Resist rollers 38 are arranged upstream of the transfer device 42 and the image holder 44 in the paper conveying direction. Further, first discharge rollers 40 are arranged in the vicinity of the first discharge port 34 of the main conveyance path 32.

Accordingly, the sheets of paper 20 fed out from the paper feeding cassette 22 of the paper feeder 18 by the pick-up roller 24 are sorted by a cooperative operation of the retard roller 26 and the feeding roller 28 so that only the uppermost paper 20 is led to the main conveyance path 32. The paper 20 is temporarily stopped by the resist roller 38 and, thereafter, the paper 20 passes through between the transfer device 42 and the image holder 44 described later at proper timing so that a developer image is transferred to the paper 20. The transferred developer image is fixed to the paper 20 by the fixing device 36, and the paper 20 is discharged to the first paper discharging part 16 from the first discharge port 34 by the first discharge roller 40.

A paper discharging tray 48 is mounted on a front surface side (a left side surface of the image forming apparatus 10 shown in FIG. 1) of the image forming apparatus body 12, and is used as a second paper discharging portion 50 to which the paper 20 is discharged. That is, the main conveyance path 32 is bifurcated in front of the discharge roller 40, a changeover device 46 is arranged at a bifurcated portion, and a sub conveyance path 52 is formed from the bifurcated portion to the second paper discharging portion 50. When the changeover device 46 is changed over to a side on which the sub conveyance path 52 is opened, the paper 20 is led to the sub conveyance path 52, and is discharged to the second paper discharging portion 50 from a second discharge port 55 by a second discharge roller 54 which constitutes a discharge member. Further, an identification mark imparting device 70 described later (shown in FIG. 2) is arranged downstream of the second discharge roller 54 in the paper conveying direction.

The image forming unit 14 is of an electrophotographic system, for example, and is constituted of an image holder 44 formed of a photosensitive body, a charging device 56 formed of a charging roll for charging the image holder 44, for example, an optical writing device 58 for writing a latent image in the image holder 44 charged by the charging device 56 with light, a developing device 60 for visualizing the latent image of the image holder 44 formed by the optical writing device 58 using a developer, a transfer device 42 formed of a transfer roll for transferring the developer image developed by the developing device 60 to the paper 20, for example, a cleaning device (not shown in the drawing) formed of blades for cleaning the developer remaining on the image holder 44, for example, and the fixing device 36 for fixing the developer image to the paper 20 which is transferred by the transfer device 42 to the paper 20.

The manual paper feeder 64 is mounted on a front surface side (a left side surface of the image forming apparatus 10 shown in FIG. 1) of the image forming apparatus body 12. The manual paper feeder 64 includes a manual feeding tray 66 which is arranged rotatable relative to the image forming apparatus body 12 and accommodates the paper 20 therein, and a manual feeding roller 68 which feeds the paper 20 accommodated in the manual feeding tray 66. The paper 20 accommodated in the manual feeding tray 66 is fed toward the main conveyance path 32 due to the rotation of the manual feeding roller 68. The paper 20 fed by the manual feeding roller 58 is, in the same manner as the paper fed by the paper feeder 18, discharged to the first paper discharging portion 16 or the second paper discharging portion 50 after passing through the resist rolls 38, between the transfer device 42 and the image holder 44 and the fixing device 36.

The user interface device 301 used as an input unit as well as a display is integrally formed with the image forming apparatus body 12 or is connected with the image forming apparatus body 12 via a network. The user interface device 301 includes a display panel 301*a* and an input button 301*b*, and selects and displays the processing contents of the image forming apparatus 10.

A voice generating device 90 is constituted of a speaker or the like, for example, and is configured to generate a buzzer sound or a message sound at a front side of the image forming apparatus body 12 (a left side in FIG. 1), for example. Further, the voice generating device 90 is electrically connected to the controller 300 and is controlled by the controller 300.

In performing the both-side printing, the image forming apparatus 10 of this exemplary embodiment performs printing on a front surface of the paper 20, that is, a first surface of the paper 20 and, thereafter, performs printing on a back surface of the paper 20, that is, a second surface of the paper 20 after an operator feeds the paper to the manual paper feeder 64 again.

Next, the peripheral structure of the second discharge roller 54 is explained in detail.

Figure 2A:
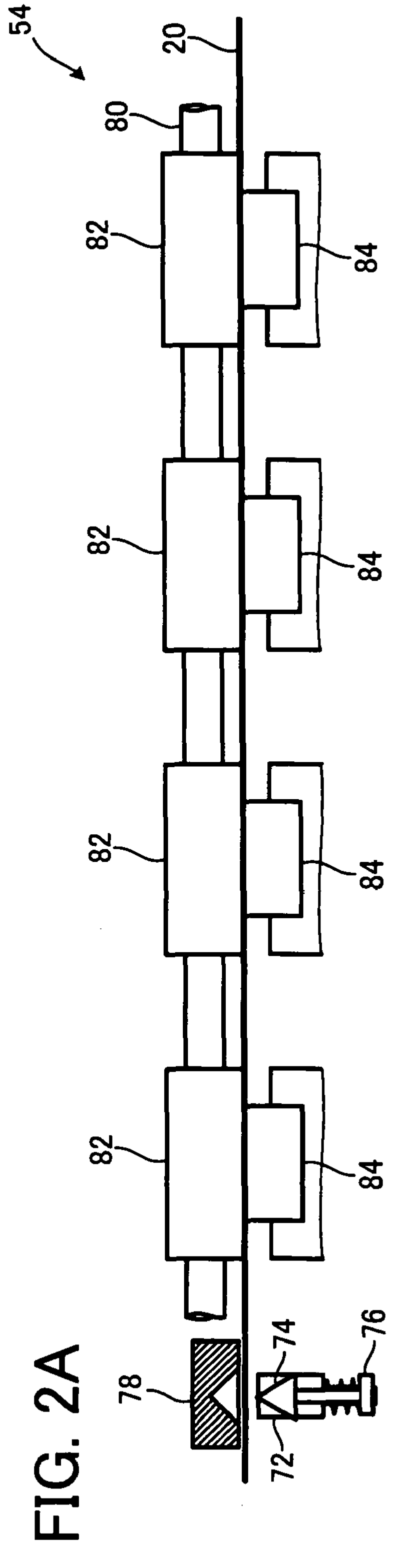

As shown in FIG. 2, the second discharge roller 54 includes a support shaft 80 which constitutes a rotary shaft, discharge rolls 82 which constitute a body portion, and pinch rolls 84. The support shaft 80 is rotatably supported on the image forming apparatus body 12, and is connected to a drive source (not shown in the drawing). The plural (for example, four) discharge rolls 82 are fixed to the support shaft 80. The plural (for example, four) pinch rolls 84 are rotatably supported on the image forming apparatus body 12 and are brought into contact with the respective discharge rolls 82. The respective pinch rolls 84 are rotated along with the rotation of the discharge rolls 82.

The identification mark imparting device 70 which constitutes an identification mark imparting unit is arranged downstream of the second discharge roller 54 in the paper conveying direction and in the vicinity of one end portion of the second discharge roller 54 in the axial direction. The identification mark imparting device 70 includes a solenoid 72 which constitutes an actuator, an identification mark forming member 74, a lever member 76 and a receiving member 78.

The solenoid 72 is electrically connected to the controller 300, and the lever member 76 is mounted on a distal end portion of the solenoid 72 by way of a coil spring 72*a*. The lever member 76 connects a movable portion of the solenoid 72 and a rear end portion of the identification mark forming member 74 to each other. The identification mark forming member 74 includes a projecting portion 74*a* which is formed into a conical shape, for example. The receiving member 78 is formed into a shape which allows the receiving member 78 to engage with the projecting portion 74*a* of the identification mark forming member 74, and is arranged at a position corresponding to the identification mark forming member 74 with the sub paper conveyance path 52 sandwiched between the receiving member 78 and the identification mark forming member 74.

Figure 2B:
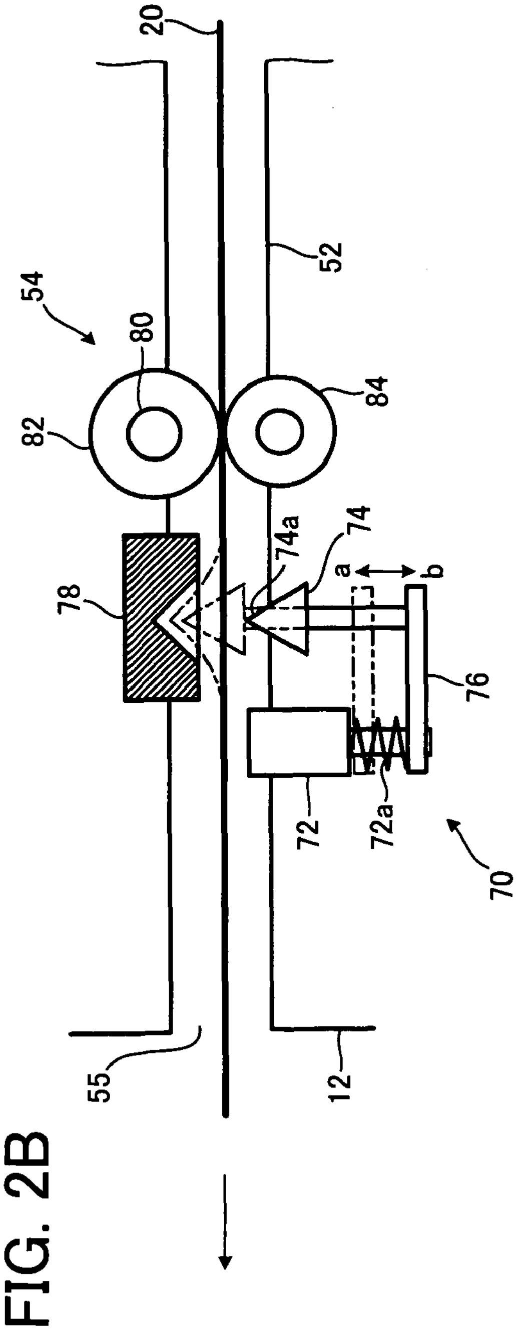
Figure 3A:
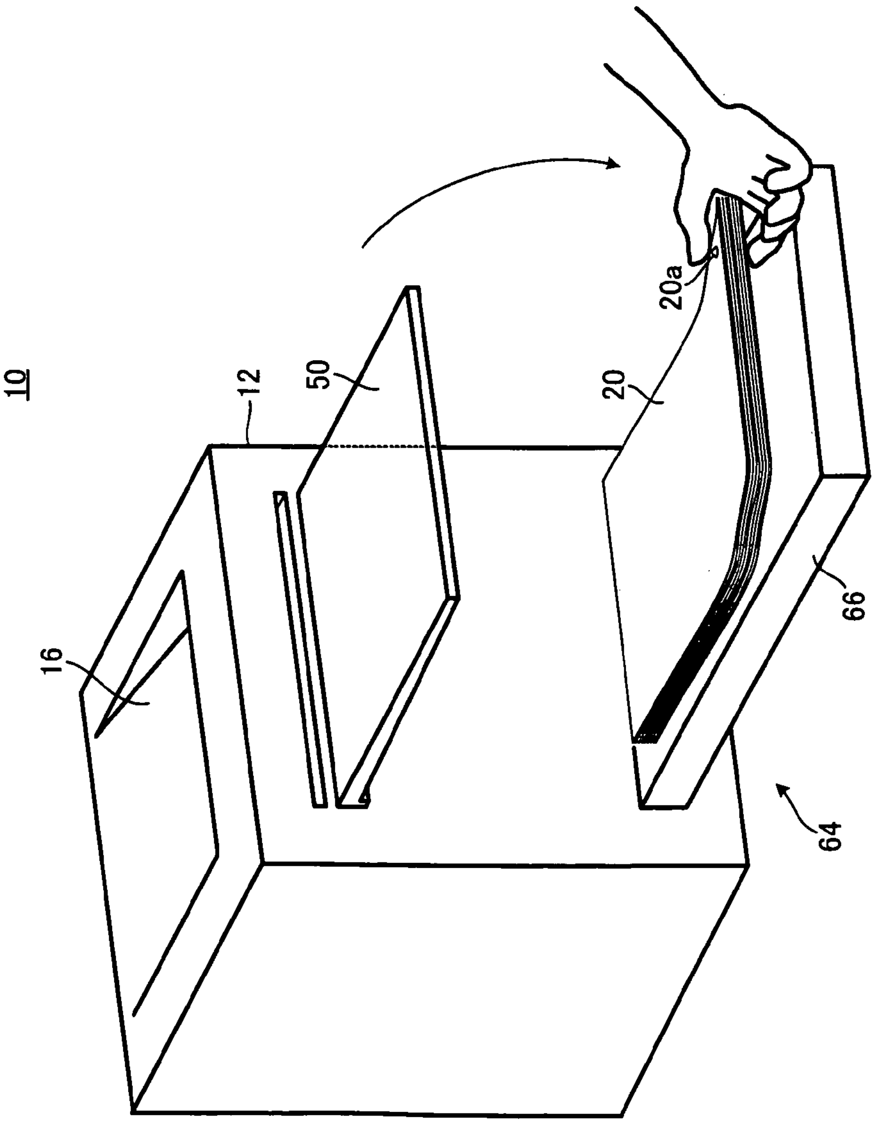
FIG. 3A is a perspective view for explaining resetting of a paper in both-side printing.
Figure 3B:
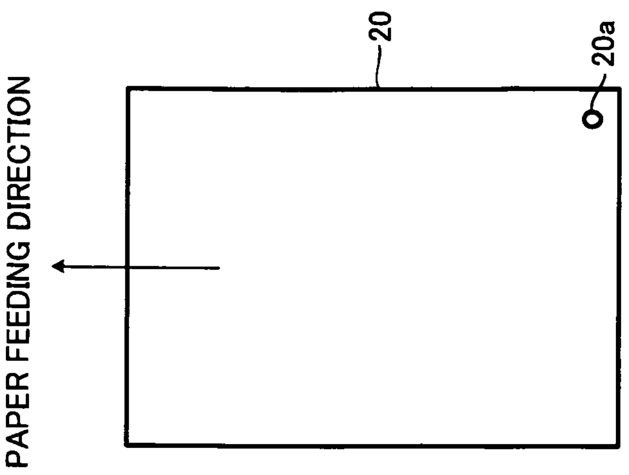
FIG. 3B is a view for explaining an identification mark printed on the paper.

When the solenoid 72 assumes an excited state (ON) at predetermined timing in response to a control signal from the controller 300, a magnetic attraction force acts on the lever member 76 and hence, the lever member 76 is attracted toward a sub conveyance path 52 side against a biasing force of the coil spring 72*a*, that is, in the direction indicated by an arrow "a" in FIG. 2B. Here, the projecting portion 74*a* of the identification mark forming member 74 is brought into contact with the receiving member 78 by way of the paper 20, and a projecting identification mark 20*a* is formed on the paper 20 led to the sub paper conveyance path 52 at a predetermined position of the paper 20, for example, on a right side of a leading portion of the paper 20 in the paper feeding direction as shown in FIG. 3B. In this manner, the identification mark imparting device 70 is configured to impart the identification mark 20*a* to the paper 20 on which an image is formed by the image forming unit 14 for allowing the operator to identify a front and a back of the paper 20 with his/her sense of touch. As shown in FIG. 3A, when the identification mark 20*a* is formed on the right side of the leading portion of the paper 20 in the paper feeding direction, for example, when an operator is right-handed, the operator can easily touch the identification mark 20*a* by his/her right hand compared to a case that the identification mark 20*a* is formed at other positions of the paper 20.

When the solenoid 72 assumes a non-excited state (OFF) at predetermined timing in response to a control signal from the controller 300, a magnetic attraction force of the solenoid 72 toward the lever member 76 is released and hence, the lever member 76 is moved to a side opposite to the sub conveyance path 52 due to the biasing force of the coil spring 72*a*, that is, in the direction indicated by an arrow "b" shown in FIG. 2C. Here, the projecting portion 74*a* of the identification mark forming member 74 is moved to a position where the projecting member 74*a* is not brought into contact with the paper 20 so that the identification mark forming member 74 does not form the identification mark on the paper 20 conveyed by the second discharge roller 54.

Figure 4:
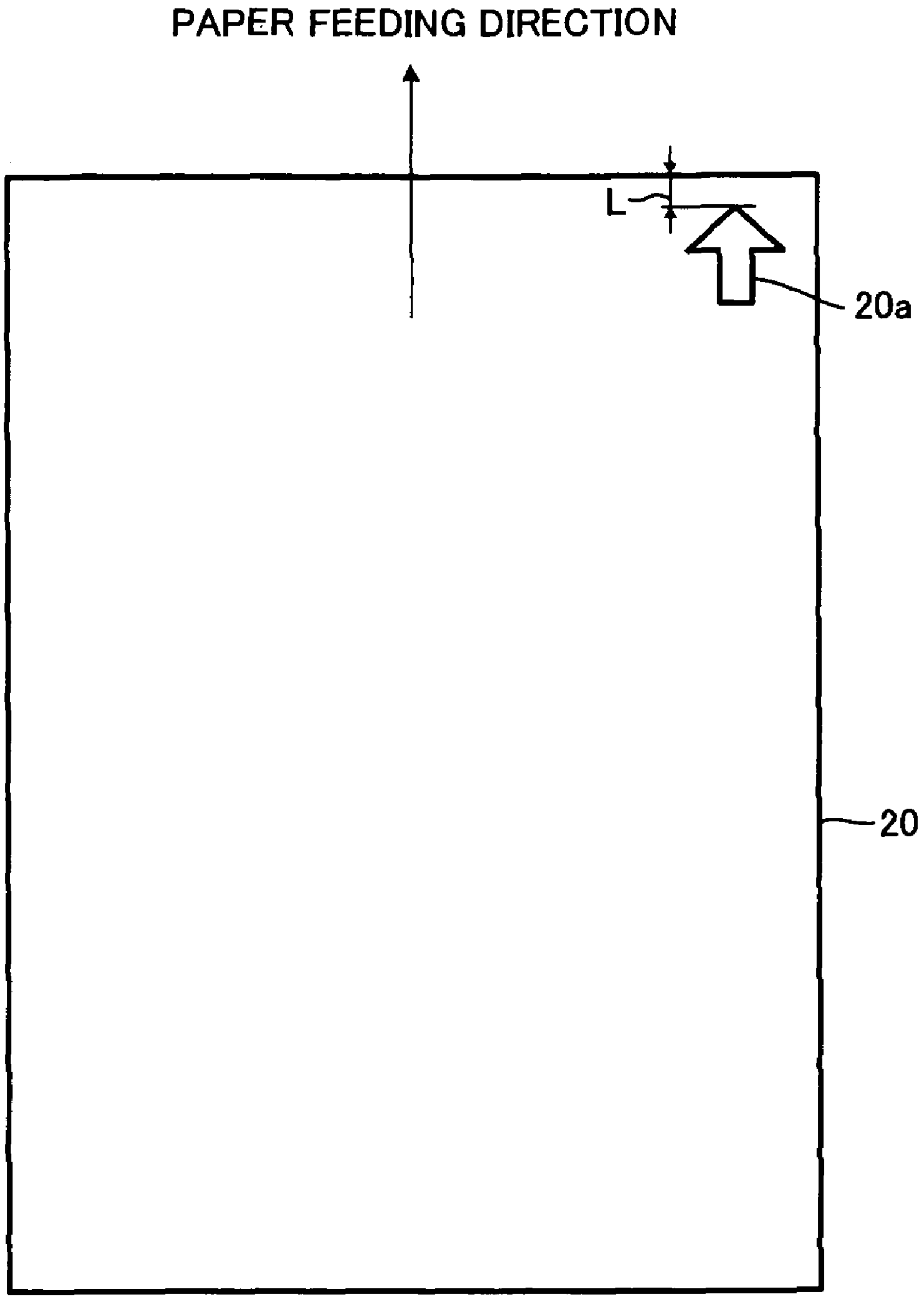
FIG. 4 is a view for explaining a shape and a position of an identification mark formed on paper by the image forming apparatus according to the first exemplary embodiment of the present invention.

In FIGS. 3A and 3B, the identification mark 20*a* having an approximately circular shape is shown as the identification mark. However, identification marks respectively having various shapes may be used as the identification marks other than the identification mark having the approximately circular shape. For example, as shown in FIG. 4, an identification mark 20*a* having an arrow shape which indicates an upward direction of the paper 20 may be formed on the paper 20. With respect to a shape of the identification mark 20*a*, any desired arbitrary shape may be acquired by changing a shape of the identification mark forming member 74 and a shape of the receiving member 78 of the identification mark imparting device 70. As shown in FIG. 4, by forming the identification mark 20*a* having an arrow shape indicating the upward direction of the paper on the paper 20, for example, the operator who is a visually handicapped person can touch the identification mark 20*a* thus identifying whether a side of the paper is an top portion or a bottom portion of the paper with his/her sense of touch.

Further, in FIGS. 3A and 3B, the example in which a position of the paper 20 where the identification mark 20*a* is formed is arranged at a right side of a leading portion of the paper 20 in the paper conveying direction is shown. However, the forming position of the identification mark 20*a* is not limited to the right side of the leading portion of the paper 20 in the paper conveying direction, and the identification mark 20*a* may be formed at an arbitrary position. For example, as shown in FIG. 4, the identification mark 20*a* may be formed on a right side of a deep (front) portion of the paper 20 in the paper conveying direction. The position of the paper 20 where the identification mark 20*a* is formed, with respect to the width direction of the paper, can be changed by changing a mounting position of the identification mark forming member 74 and a mounting position of the receiving member 78 in the inside of the image forming apparatus body 12. Further, the forming position of the identification mark 20*a* on the paper 20 in the paper conveying direction can be changed by adjusting timing that the solenoid 72 is excited (ON) and timing that the projecting portion 74*a* of the identification mark 74 and the receiving member 78 are brought into contact with each other.

Figure 5:
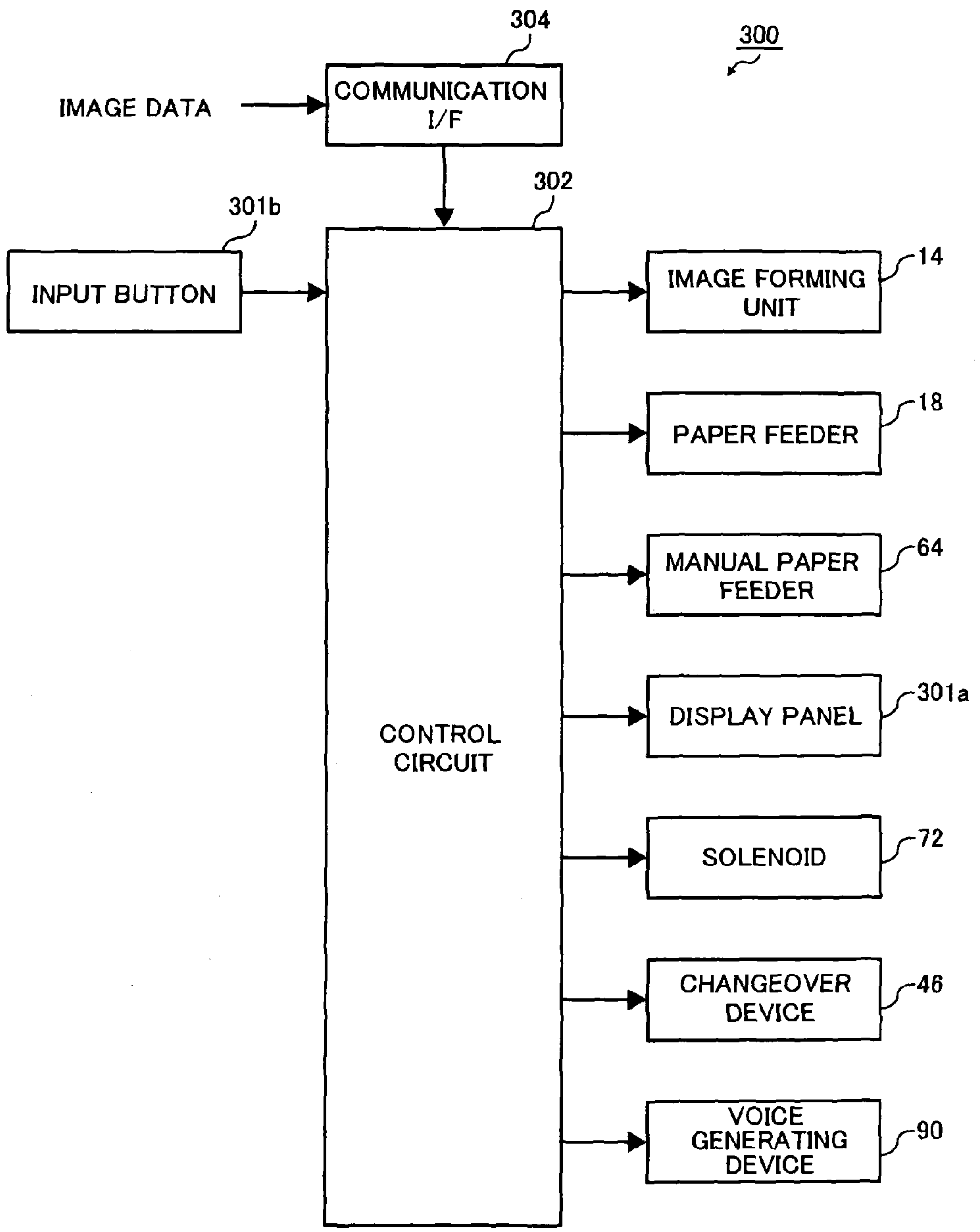
FIG. 5 is a block diagram showing a controller included in the image forming apparatus according to the first exemplary embodiment of the present invention.

FIG. 5 shows the controller 300.

The controller 300 includes a control circuit 302 constituted of a CPU, for example, and image data is inputted to the control circuit 302 via a communication interface 304. Further, an output from an input button 301*b* is inputted to the control circuit 302. In response to an output from the control circuit 302, the image forming part 14, the paper feeder 18, the manual paper feeder 64, the display panel 301*a*, the solenoid 72 of the identification mark imparting device 70, the changeover device 46, and the voice generating device 90 are controlled.

Figure 6:
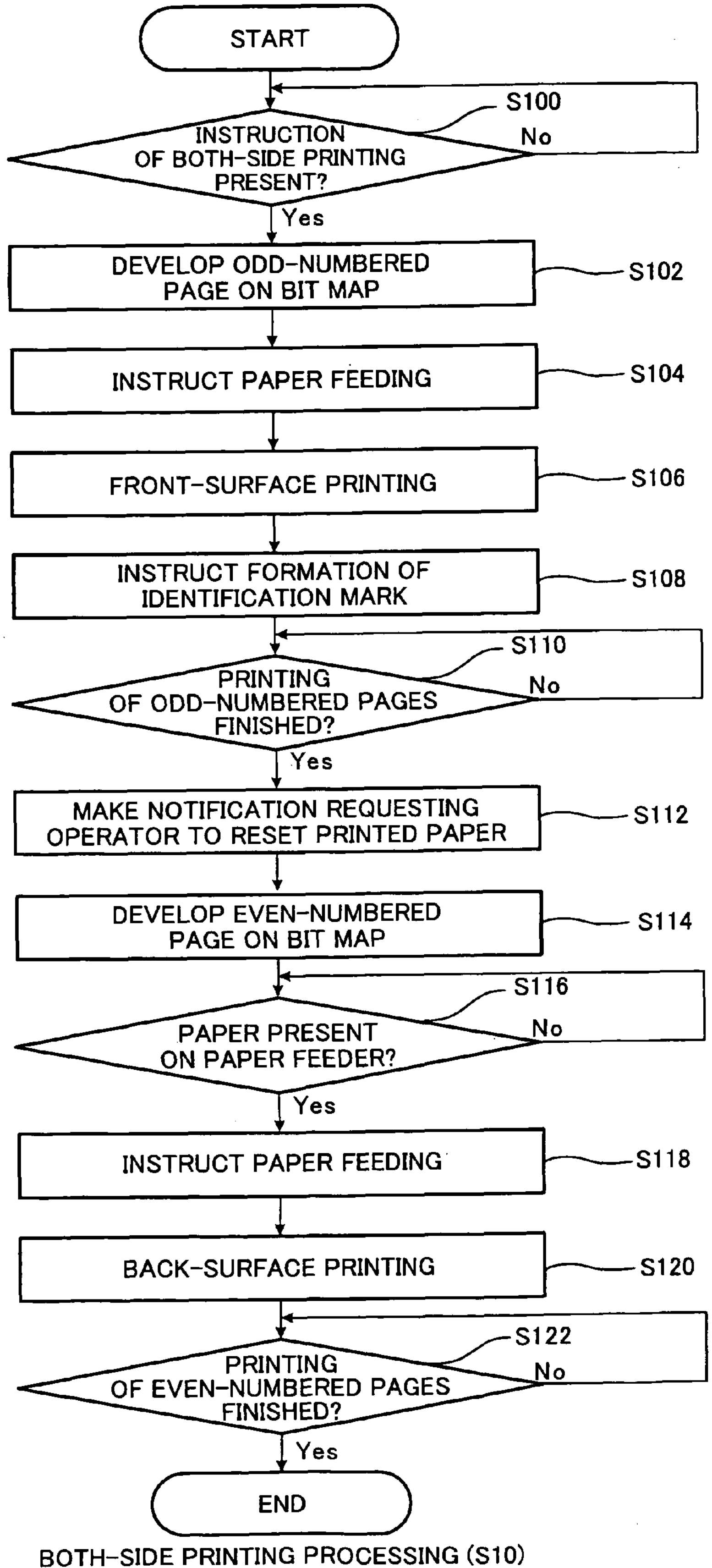
FIG. 6 is a flowchart for explaining a first example of printing processing by a controller included in the image forming apparatus according to the first exemplary embodiment of the present invention.

In FIG. 6, a control flow at the time of performing the both-side printing processing (S10) which is a first example of printing processing by the controller 300 is shown.

As shown in FIG. 6, in step 100 (S100), the controller 300 determines whether or not an instruction of both-side printing is present in input information inputted by an operation via the user interface device 301, the personal computer (not shown in the drawing) or the like. When the controller 300 determines that the instruction of both-side printing is present in the information, the processing advances to step 102 (S102), while when the controller 300 determines that the instruction of both-side printing is not present in the information, the controller 300 performs the processing of step 100 (S100) again.

In step 102 (S102), the controller 300 develops an odd-numbered page which is a first page of the input image information inputted by the operator on a bit map.

In step 104 (S104), the controller 300 transmits a paper feeding instruction to the paper feeder 18. That is, the controller 300 instructs the paper feeder 18 to feed the paper 20. Upon reception of the paper feeding instruction from the controller 300, the paper feeder 18 feeds the predetermined number of sheets of paper 20. Further, the controller 300 transmits a changeover instruction to the changeover device 46 such that the sheets of paper 20 are guided to the second paper discharge portion 50.

In step 106 (S106), the controller 300 instructs the image forming unit 14 to print an image on a front surface of the paper. Upon reception of a front-surface printing instruction from the controller 300, the image forming unit 14 forms the image on the front surface, that is, on the first surface of the paper 20.

In step 108 (S108), the controller 300 instructs the identification mark imparting device 70 to form the identification mark on the paper 20. The identification mark imparting device 70 forms the identification mark 20*a* at a predetermined position of the respective sheets of paper on which the image is printed when the identification mark imparting device 70 receives an identification mark forming instruction. To be more specific, the controller 300 outputs a control signal to the solenoid 72 of the identification mark imparting device 80 at predetermined timing so as to form the identification mark 20*a* on a right side of the leading portion of the paper 20 in the conveying direction of the paper 20 conveyed by the second discharge roller 54.

In step 110 (S110), the controller 300 determines whether or not the printing of the odd-numbered pages is finished. When the controller 300 determines that the printing of the odd-numbered pages is finished, the processing advances to step 112 (S112), while when the controller 300 determines that the printing of the odd-numbered pages is not finished, the controller 300 performs the processing of step 110 (S110) again.

In step 112 (S112), the controller 300 makes the notification requesting the operator to reset the printed paper 20, that is, the controller 300 performs a display requesting the operator to set the paper 20 discharged to the second paper discharging portion 50 on the manual feeding tray 66 of the manual paper feeder 64 on the display panel 301*a* of a user interface device 301 or on a display of a personal computer (not shown in the drawing) or the like. Here, buzzer sounds or massage voices may be used together with such notification. The operator, as shown in FIG. 3A, recognizes the front and the back of the paper 20 based on a position or a shape of the identification mark 20*a* by his/her sense of touch, that is, by touching the identification mark 20*a* formed on the paper 20. Further, the operator recognizes the paper feeding direction of the paper 20 based on the position where the identification mark 20*a* is formed, reverses the paper 20 discharged to the second paper discharging portion 50, and sets the reversed paper 20 on the second manual feeding tray 66.

In step 114 (S114), the controller 300 develops even-numbered pages which constitute second faces of the input image information inputted by the operator on bit map information.

In step 116 (S116), the controller 300 determines whether or not the sheets of paper are present in the paper feeder. To be more specific, the controller 300 determines whether or not the sheets of paper 20 are present in the manual feeding tray 66 of the manual paper feeder 64 in response to a signal from a paper detection unit (not shown in the drawing) or the like. When the controller 300 determines that the sheets of paper 20 are present in the manual feeding tray 66, the processing advances to step 118 (S118), while when the controller 300 determines that the sheets of paper 20 are not present in the manual feeding tray 66, the processing in step 116 (S116) is performed again.

In step 118 (S118), the controller 300 transmits a paper feeding instruction to the manual paper feeder 64. That is, the controller 300 instructs the manual paper feeder 64 to feed the sheets of paper 20. Upon reception of the paper feeding instruction from the controller 300, the manual paper feeder 64 feeds a predetermined number of sheets of paper 20. Further, the controller 300 transmits a changeover instruction to the changeover device 46 such that the sheets of paper 20 are guided to the first paper discharging portion 16.

In step 120 (S120), the image forming unit 14 prints an image on the back surface of the paper 20, that is, forms the image on the back surface which constitutes a second surface of the paper 20. The paper 20 with the image formed on the back surface thereof is discharged to the first discharge portion 16 by way of the fixing device 36. Here, the identification mark 20*a* formed on the paper 20 is depressed and extinguished by pressure from the fixing device 36 when the paper 20 passes the fixing device 36.

In step 122 (S122), the controller 300 determines whether or not the printing of even-numbered pages is finished, and when the controller 300 determines that the printing of the even-numbered pages is not finished, the processing in step 122 (S122) is performed again, while when the controller 300 determines that the printing of even-numbered pages is finished, the processing is finished.

As described above, the identification mark imparting device 70 imparts the identification mark 20*a* to at least a portion of the paper 20 at the time of printing the image on the front surface of the paper 20, that is, on the first surface of the paper 20, while the identification mark imparting device 70 does not impart the identification mark 20*a* at the time of printing the image on the back surface of the paper 20, that is, on the second surface of the paper 20.

Here, although the explanation has been made with respect to the case in which the identification mark imparting device 70 is arranged downstream of the second discharge roller 54 in the paper conveying direction, the identification mark imparting device 70 may be arranged downstream of the first discharge roller 40 in the paper conveying direction.

Figure 7:
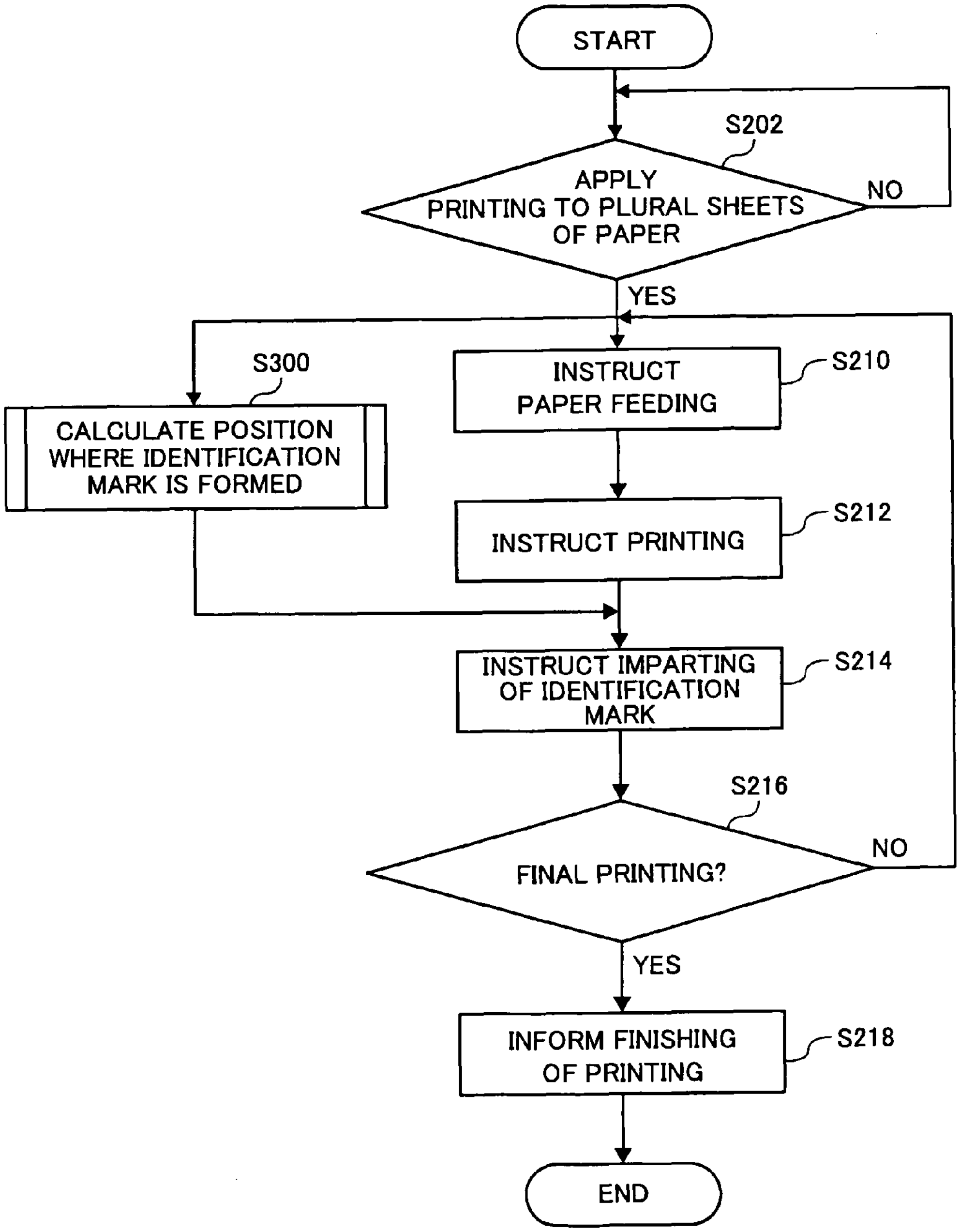
FIG. 7 is a flowchart for explaining a second example of printing processing by the controller included in the image forming apparatus according to the first exemplary embodiment of the present invention.

FIG. 7 shows a control flow when printing processing (S20) which constitutes a second example of the printing processing is performed by the controller 300. In printing processing S20, the printing (image formation) is continuously applied to plural sheets of paper 20. Further, in printing processing S20, the identification mark 20*a* with which the order of the image formation is identifiable is imparted to the paper. Particularly, corresponding to the order of the image formation, the identification marks 20*a* are imparted to respectively plural sheets of paper 20 at positions different from each other. Here, the explanation is made with respect to a case in which the image is formed on only one surface of the paper as an example.

As shown in FIG. 7, in step 202 (S202), the controller 300 determines whether or not the printing is applied to the plural sheets of paper based on information inputted by the operator via the user-interface device 301, a personal computer (not shown in the drawing) or the like. Further, when the controller 300 determines that the printing is applied to the plural sheets of paper, the processing advances to step 210 (S210) and step 300 (S300), and when the controller 300 determines that the printing is not applied to the plural sheets of paper, the processing in step 202 (S202) is performed again.

In step 210 (S210), the controller 300 transmits a paper feeding instruction to the paper feeder 18. That is, the controller 300 instructs the paper feeder 18 to feed the paper 20. Upon reception of the paper feeding instruction from the controller 300, the paper feeder 18 feeds one sheet of paper 20.

In step 212 (S212), the controller 300 transmits a printing instruction to the image forming part 14. Upon reception of the surface printing instruction from the controller 300, the image forming part 14 forms an image on a front surface, that is, a first surface of the paper 20.

In step 300 (S300), the controller 300 performs the calculation for determining a position of the paper 20 where the identification mark 20*a* is formed. The forming position of the identification mark 20*a* on the paper 20 is obtained by performing the calculation with respect to the respective sheets of paper so as to form the identification mark 20*a* at different positions for respective sheets of paper 20 corresponding to the order of the printing in one printing job. The calculation in step 300 is explained in detail later.

In step 214 (S214) which follows step 212 (S212) and step 300 (S300), the controller 300 instructs the identification mark imparting device 70 to form the identification mark 20*a* on the paper 20. Upon reception of the identification forming instruction from the controller 300, the identification imparting unit 70 forms the identification mark 20*a* on each sheet of paper 20 on which the image is formed at a position calculated in step 300. To be more specific, the controller 300 outputs a control signal to the solenoid 72 of the identification mark imparting device 70 at timing calculated in step 300 so as to form the identification mark 20*a* at a right side of the leading portion of the paper 20 in the conveying direction of the paper 20 conveyed by the second discharge roller 54.

In next step 216 (S216), the controller 300 determines whether or not the above-mentioned series of processing is final image forming processing in one printing job based on inputted image data. When the controller 300 determines that the above-mentioned series of processing is the final printing, processing advances to next step 218 (S218), and when the controller 300 determines that the above-mentioned series of processing is not the final printing, processing returns to step 210 (S210).

In next step 218 (S218), the controller 300 allows the voice generating device 90 to generate voice information that the printing processing is finished. Due to such voice information, for example, the operator, visually handicapped, is informed of the finishing of printing processing through the sense of hearing.

Figure 8:
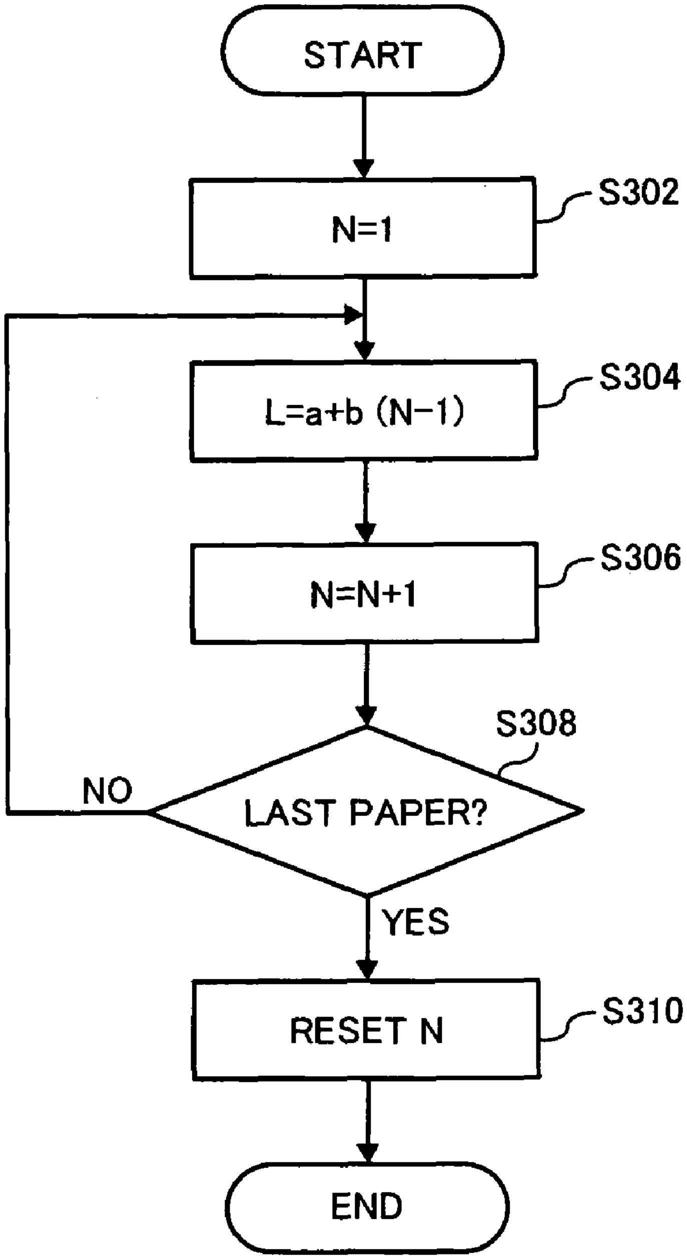
FIG. 8 is a flowchart showing a control flow when a position of the paper where the identification mark is formed is calculated in the second example of the printing processing by the controller included in the image forming apparatus according to the first exemplary embodiment of the present invention.

FIG. 8 shows a control flow for calculating the positions where the identification mark 20*a* is formed on the paper 20 in step 300 by the controller 300.

As shown in FIG. 8, when the calculation of the position where the identification mark 20*a* is formed on the paper 20 is started, the controller 300 sets the order N of the paper to 1 in step 302 (S302).

In next step 304 (S304), the controller 300 calculates the position where the identification mark 20*a* is formed on the Nth paper. To be more specific, the controller 300 calculates a length L from a leading end portion of the paper to the position where the identification mark 20*a* is formed based on a formula $L=a+b(N-1)$. Here, "a" and "b" are preset values, wherein "a" is a distance from the paper leading end portion to the position of the first paper where the identification mark 20*a* is formed and "b" is a distance between a position of one sheet of paper 20 where the identification mark 20*a* is formed and a position of paper 20 which follows one paper where the identification mark 20*a* is formed. The values calculated in step 304 (S304) are used in the previously mentioned step 208 (S208).

In next step 306 (S306), the controller 300 adds 1 to the order N of the paper. In next step 308 (S308), the controller 300 determines whether or not the paper with the identification mark 20*a* whose position is calculated is the last paper based on the imputed image data or the like. When it is determined that the paper is the last paper based on the identification mark 20*a*, the processing advances to step 310 (S310), while when it is determined that the paper is not the last paper, the processing returns to step 304 (S304).

In next step 310 (S310), the controller 300 resets N.

Figure 9:
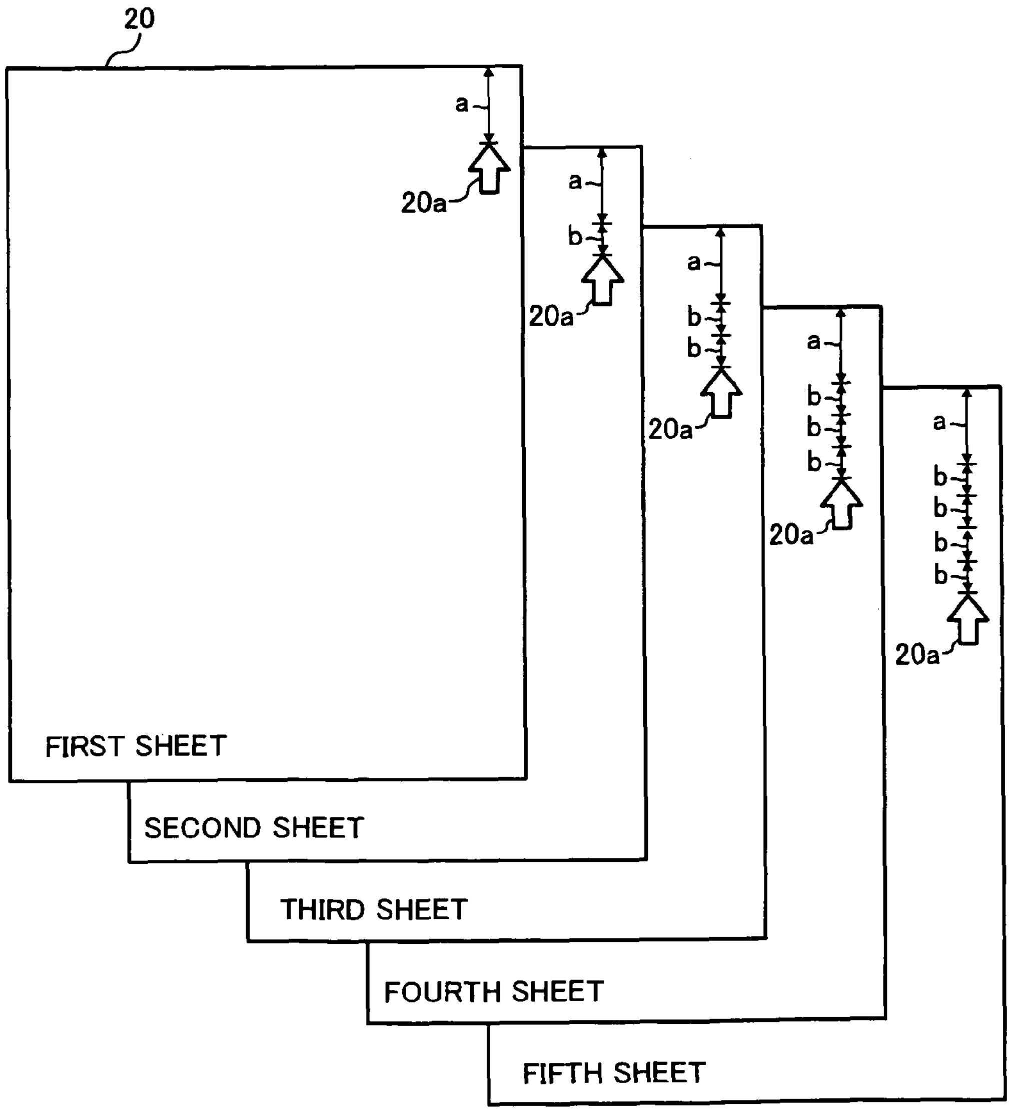
FIG. 9 is a view for explaining a position where the identification mark is formed on the paper on which an image is formed in the second example of the printing processing by the controller included in the image forming apparatus according to the first exemplary embodiment of the present invention.

FIG. 9 shows the first to fifth sheets of paper 20 to which the identification mark 20*a* which allows the operator to identify the order of image formation is imparted in the printing processing (S20) which constitutes a second example of printing processing.

As shown in FIG. 9, on the first paper 20, the identification mark 20*a* is formed on a right-side portion in the paper feeding direction and at a position with a length a away from the leading end portion thereof. Further, on the second paper 20, the identification mark 20*a* is formed on a right-side portion in the paper feeding direction and at a position with a length a+b away from the leading end portion thereof, and on the third paper 20, the identification mark 20*a* is formed on a right-side portion in the paper feeding direction and at a position with a length a+2b away from the leading end portion thereof.

In this manner, the identification mark 20*a* is formed on the paper 20 at different positions corresponding to the order of printing and hence, for example, the visually handicapped operator can identify how many sheets of paper are printed with his/her sense of touch.

The number of identification marks formed on each sheet of paper may be changed corresponding to the order that the sheet of paper is printed.

Figure 10:
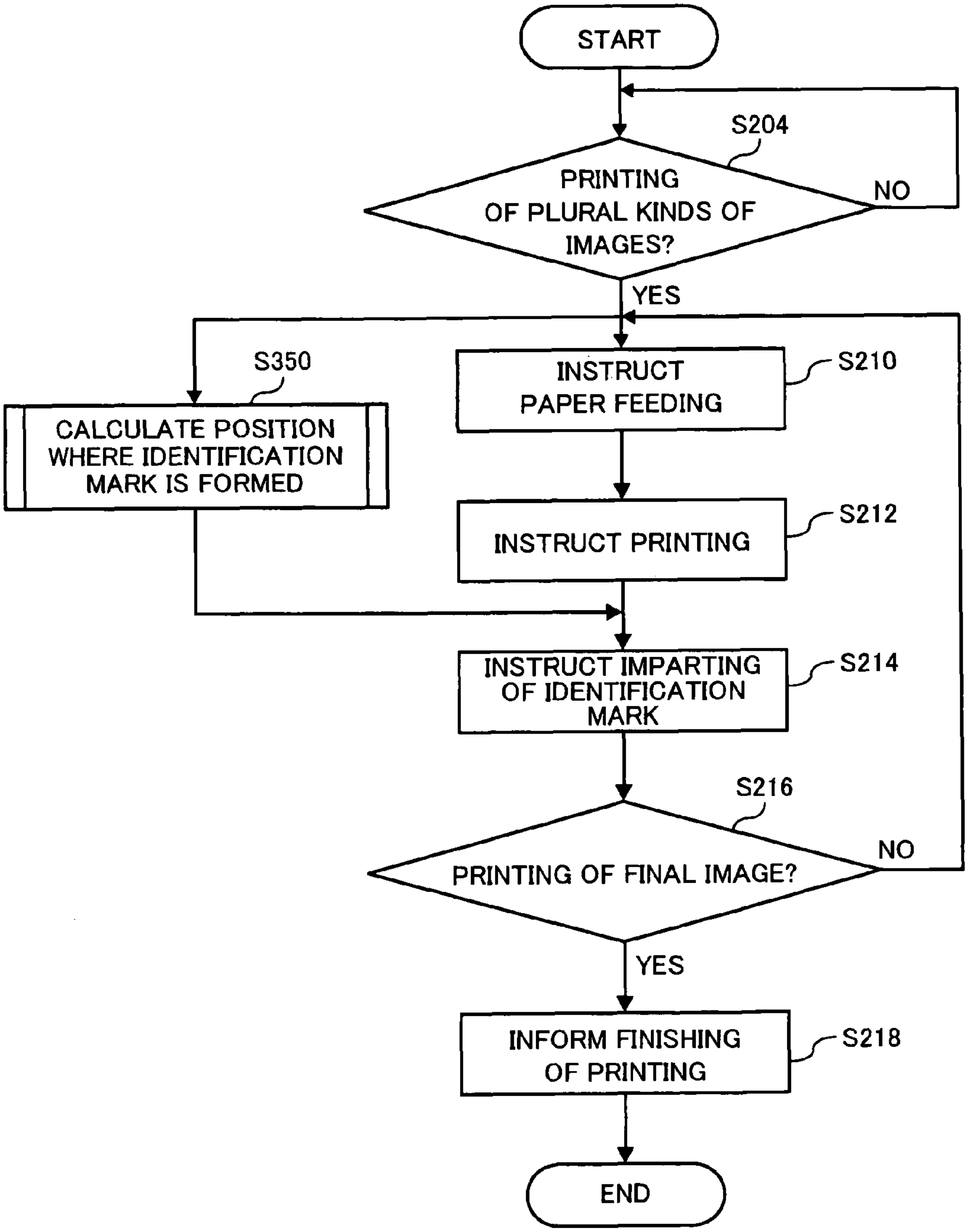
FIG. 10 is a flowchart for explaining a third example of printing processing by the controller included in the image forming apparatus according to the first exemplary embodiment of the present invention.

FIG. 10 shows a control flow when printing processing (S40) which constitutes a third example of the printing processing is performed by the controller 300. In printing processing S40, plural kinds of printing (formation of images) different from each other are continuously applied to plural sheets of paper 20. Further, in printing processing S40, the identification mark 20*a* which allows the operator to identify kinds of printed images is imparted to sheets of paper. Particularly, corresponding to the kinds of printed images, the identification marks 20*a* are respectively imparted to plural sheets of paper 20 at positions different from each other. Here, the explanation is made with respect to a case in which the image is formed only one surface of the paper as an example.

In the above-mentioned printing processing (S20) which constitutes the second example of the printing processing in step 202, the controller 300 determines whether or not the processing for continuously forming images on the plural sheets of paper (plural paper processing) is performed. Compared to such printing processing, in printing processing (S40) which constitutes the third example of the printing processing, the controller 300, as shown in FIG. 10, in step 204 (S204), determines whether or not the images continuously formed on the plural sheets of paper, particularly whether or not plural kinds of images are printed (image formation). Then, when the controller 300 determines that the plural kinds of images are printed, the processing advances to step 210 (S210) and step 350 (S350), while when the controller 300 determines that the image is not formed on the plural sheets of paper, processing in step 204 (S204) is performed again.

Further, in the previously mentioned printing processing S20, in step 300, positions where the identification mark 20*a* is formed are calculated with respect to the respective sheets of paper such that the positions differ from each other for respective sheets of paper 20 corresponding to the order of printing performed in one printing job. Compared to such printing processing, in printing processing S40, in step 350, positions where the identification mark 20*a* is formed with respect to the respective sheets of paper are calculated such that the identification mark 20*a* is imparted to positions of plural sheets of paper 20 different from each other corresponding to kinds of printed images. The details of the calculation in step 350 are described later.

Controls other than the control explained above are substantially equal to the corresponding controls of the previously explained printing processing S20 and hence, the explanation of the controls is omitted by adding the same numerals to the corresponding parts shown in FIG. 10.

Figure 11:
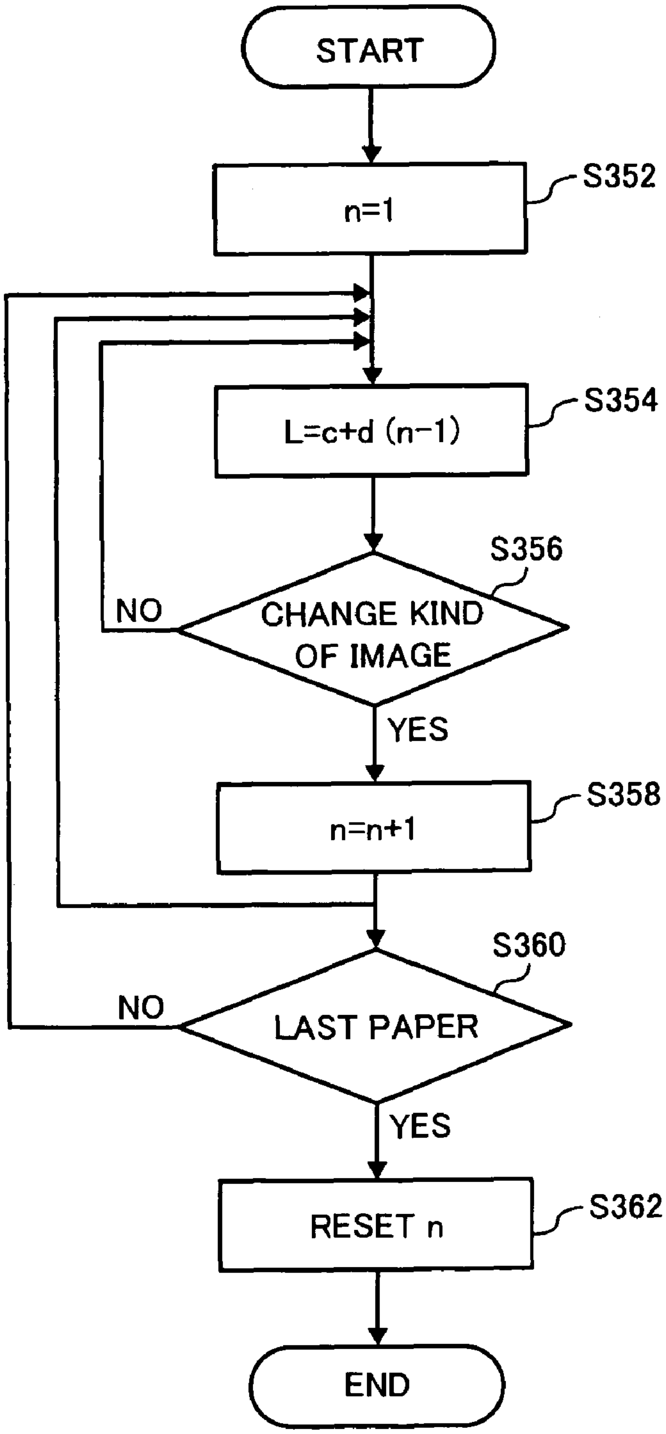
FIG. 11 is a flowchart showing a control flow when a position of the paper where the identification mark is formed is calculated in the third example of the printing processing by the controller included in the image forming apparatus according to the first exemplary embodiment of the present invention.

FIG. 11 shows a control flow for calculating positions where the identification mark 20*a* is formed on the paper 20 in step 350 by the controller 300.

As shown in FIG. 11, when the calculation of the position where the identification mark 20*a* is formed on the paper 20 is started, the controller 300 sets the order n of the image to be printed to 1 in step 352 (S352).

In next step 354 (S354), the controller 300 calculates the position where the identification mark 20*a* is formed on the paper on which the nth image is formed. To be more specific, the controller 300 calculates a length L from a leading end portion of the paper to the position where the identification mark 20*a* is formed using a formula L=c+d (N−1). Here, c and d are preset values, wherein c is a distance from the paper leading end portion to the position where the identification mark 20*a* is formed on the paper on which the first kind of image is printed, and d is an interval between the position where the identification mark 20*a* is formed on the paper 20 on which a certain kind of image is formed and the position where the identification mark 20*a* is formed on the paper 20 on which next kind of image is formed. The values calculated in step 354 (S354) are used in the previously mentioned step 214 (S214).

In step 356 (S356), the controller 300 determines based on the inputted image date or the like whether or not the kind of image to be printed is changed. When it is determined that the kind of image to be printed is changed, the processing advances to next step 358 (S358). When it is determined that the kind of image to be printed is not changed, the processing returns to step 354.

In next step 358 (S358), the controller 300 adds 1 to the order n indicative of the kind of image, and the processing returns to step 354 and, at the same time, advances to next step 360 (S360).

In next step 360 (S360), the controller 300 determines whether or not the paper with the identification mark 20*a* whose position is calculated is the last paper based on the inputted image data or the like. When it is determined that the paper is the last paper based on the identification mark 20*a*, the processing advances to step 362 (S362), while when it is determined that the paper is not the last paper, the processing returns to step 354 (S354).

In next step 362 (S362), the controller 300 resets the order n.

Figure 12:
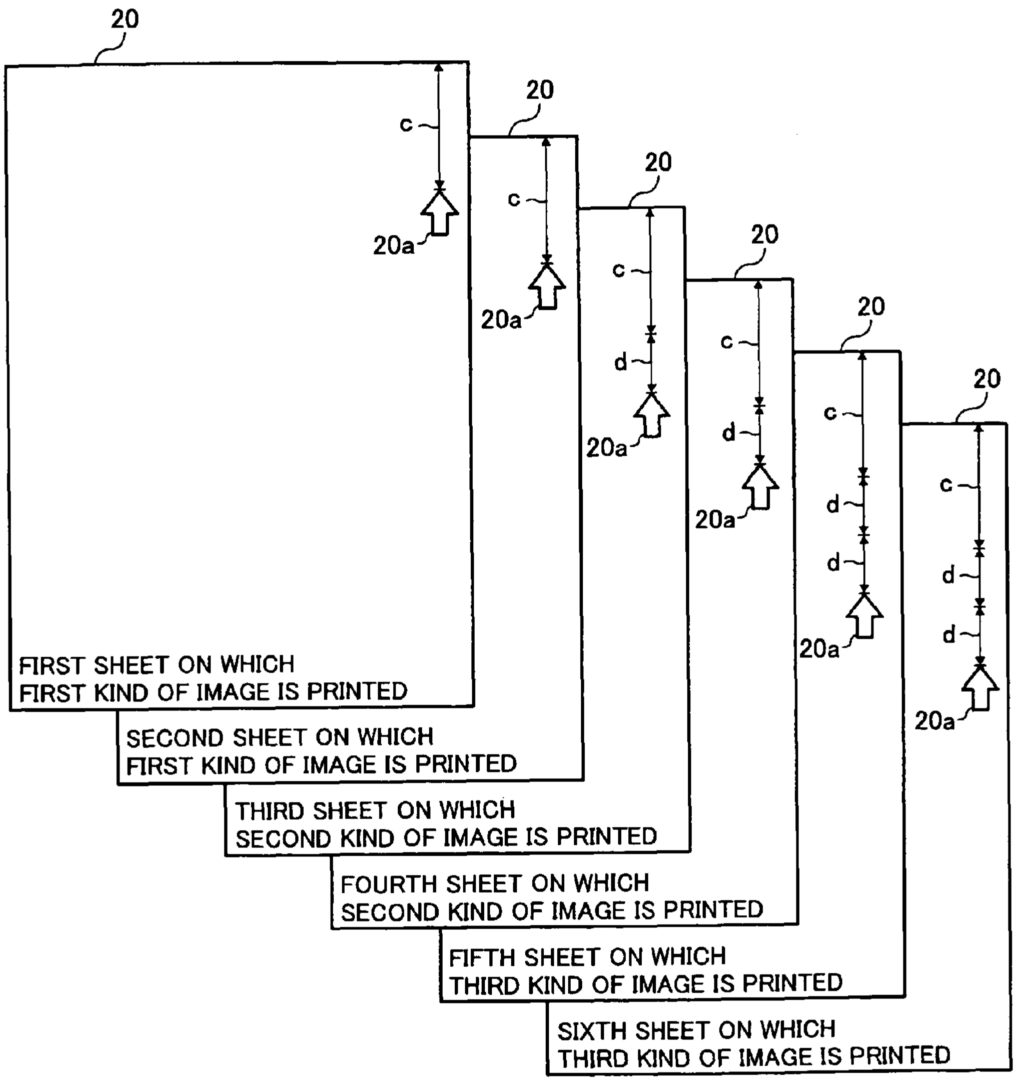
FIG. 12 is a view for explaining a position where the identification mark is formed on the paper on which an image is formed in the third example of the printing processing by the controller included in the image forming apparatus according to the first exemplary embodiment of the present invention.

FIG. 12 shows the printing processing (S40) which constitutes a third example of the printing processing, wherein sheets of paper ranging from the first paper 20 to the sixth sheets of paper 20 to which the identification mark 20*a* with which the kinds of images are identifiable is imparted are shown. FIG. 12 shows the example in which three kinds of images are formed, that is, out of these three kinds of images, the first kind of image is printed on the first sheet and the second sheet, the second kind of image is printed on the third sheet and the fourth sheet, and the third kind of image is printed on the fifth sheet and the sixth sheet among these images.

As shown in FIG. 12, on the first and second sheets of paper 20 on which the first kind of image is printed, the identification mark 20*a* is formed on a right-side portion in the paper feeding direction and at a position with a length c away from the leading end portion of the paper 20. On the third and fourth sheets of paper 20 on which the second kind of image is printed, the identification mark 20*a* is formed on a right-side portion in the paper feeding direction and at a position with a length c+d away from the leading end portion of the paper 20. Further, on the fifth and sixth sheets of paper 20 on which the third kind of image is printed, the identification mark 20*a* is formed on a right-side portion in the paper feeding direction and at a position with a length c+2d away from the leading end portion of the paper 20.

As described above, the identification marks 20*a* are respectively formed on the paper 20 at positions different form each other corresponding to the kinds of images and hence, for example, the visually handicapped operator can identify the sheets of paper on which different kinds of images are printed using his/her sense of touch.

The kinds of images may be names of plural addressees when vouchers directed to the addressees are continuously printed. In this case, when the identification marks are formed at different positions corresponding to the respective addressees, for example, a visually handicapped operator can sort out the vouchers for the respective addressees with his/her sense of touch.

With respect to the above-explained printing processing (S20) which constitutes the second example of the printing processing and the above-explained printing processing (S40) which constitutes the third example of the printing processing, only either one of these processing operations may be performed using one image forming apparatus 10 or, for example, the operator may select the processing using an input button 301*b* or the like.

Figure 13A:
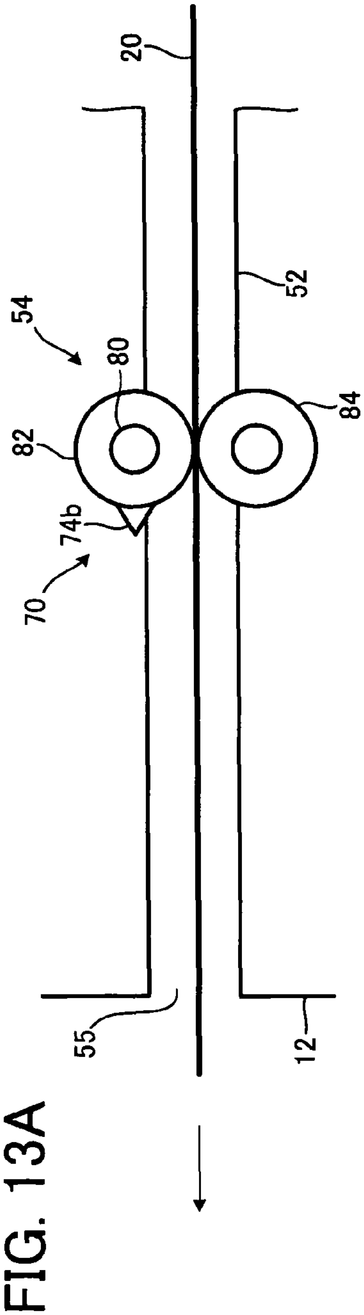
Figure 13B:
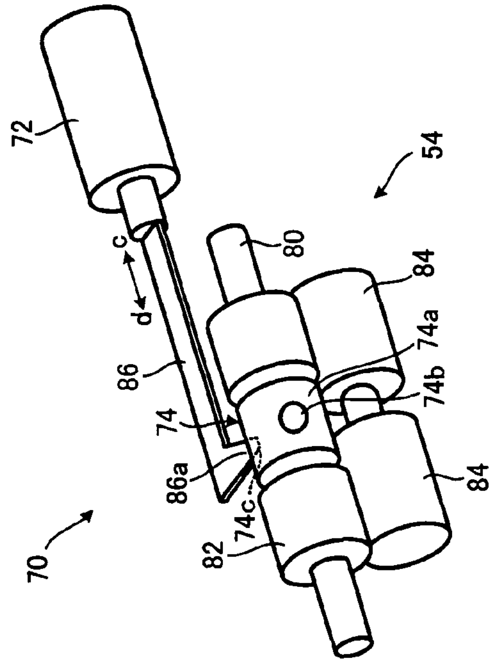

Next, a first modification of an identification mark imparting device 70 is explained in conjunction with FIG. 13.

As shown in FIG. 13, the identification mark imparting device 70 according to the first modification includes a solenoid 72, an identification mark forming member 74 and a stopper 86.

The identification mark forming member 74 includes a body portion 74*a* formed in a cylindrical shape, and a projection portion 74*b* having a conical shape, for example, and integrally formed with the body portion 74*a* at a portion of an outer peripheral surface of the body portion 74*a*. Further, an engaging portion 74*c* which engages with an engaging portion 86*a* of the stopper 86 described later is formed on the body portion 74*a*. The identification mark forming member 74 is mounted on a support shaft 80 which constitutes a rotary shaft of the second discharge roller 54 by way of a clutch (not shown in the drawing). The identification mark forming member 74 is rotated along with the rotation of the support shaft 80 when the identification mark forming member 74 is not stopped by the stopper 86.

The stopper 86 which constitutes a stopping unit is connected to a movable portion of the solenoid 72, and the engaging portion 86*a* which engages with the engaging portion 74*c* of the body portion 74*a* of the identification mark forming member 74 is formed on a distal end portion of the stopper 86.

The solenoid 72 is electrically connected with the controller 300, and moves the stopper 86 in the axial direction (directions indicated by arrows c, d in FIG. 5B) of the support shaft 80 in response to a control signal from the controller 300.

When the solenoid 72 assumes an excited state (ON) at predetermined timing in response to a control signal from the controller 300, a magnetic attraction force acts on the stopper 86 and hence, the stopper 86 moves toward the solenoid 72 side, that is, in the direction indicated by the arrow c in FIG. 5B. When the stopper 86 is moved toward the solenoid 72 side, the engagement between the engaging portion 74*c* of the identification mark forming member 74 and the engaging portion 86*a* of the stopper 86 is released so that the identification mark forming member 74 is rotated along with the rotation of the support shaft 80. Due to such rotation, the identification mark forming member 74 forms the identification mark 20*a* at a predetermined position of the paper 20 conveyed by the second discharge roller 54.

When the solenoid 72 assumes a non-excited state (OFF) at predetermined timing in response to a control signal from the controller 300, the magnetic attraction force acting on the stopper 86 is eliminated so that the stopper 86 moves toward a side opposite to the solenoid 72, that is, in the direction indicated by the arrow "d" in FIG. 5B. When the stopper 86 moves toward the side opposite to the solenoid 72, the engaging portion 74*c* of the identification mark forming member 74 and the engaging portion 86*a* of the stopper 86 engage with each other and hence, the identification mark forming member 74 is stopped due to an action of a clutch (not shown in the drawing). Here, the projection portion 74*b* of the identification park forming member 74 is configured to stop at a position where the projecting portion 74*b* is not brought into contact with the paper 20 and hence, the identification mark forming member 74 does not form an identification mark on the paper 20 conveyed by the second discharge roller 54.

In the explanation of the identification mark imparting device 70 according to the first modification, the parts identical with the corresponding parts of the image forming apparatus of the first exemplary embodiment of the present invention are given same numerals and their explanation is omitted.

Figure 14:
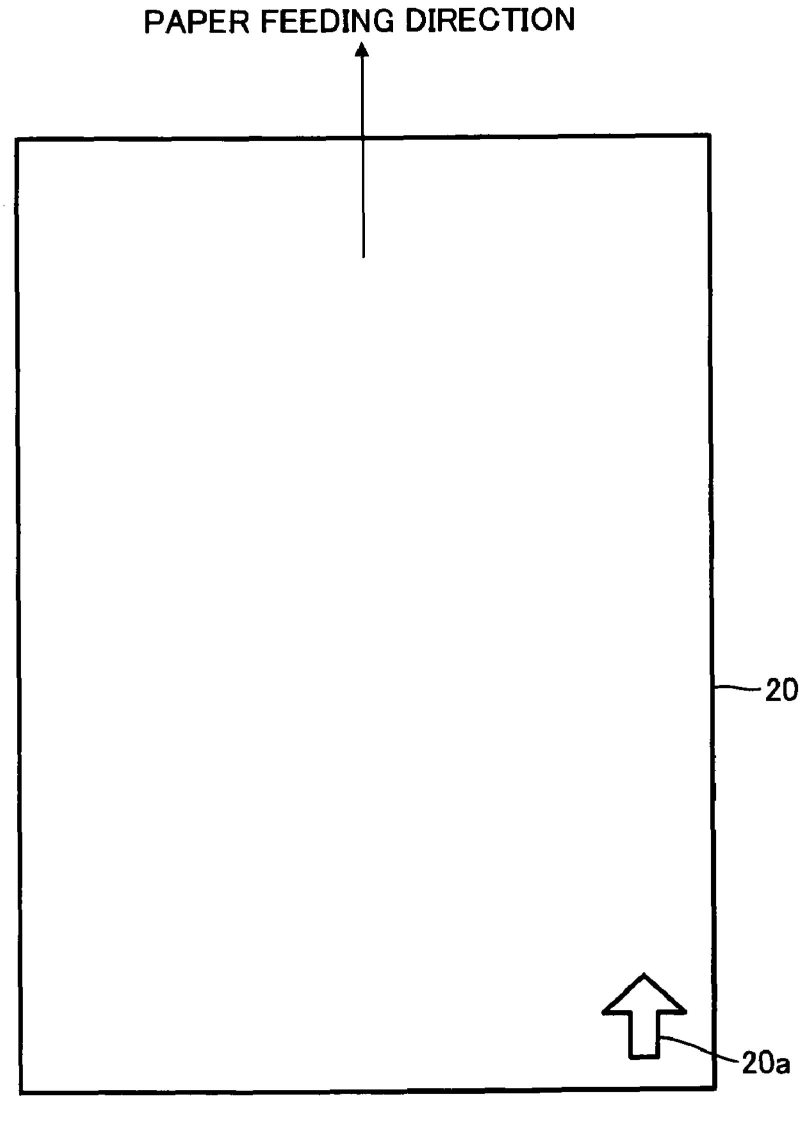
FIG. 14 is a view for explaining an identification mark formed on the paper by a second modification of the identification mark imparting unit used in the first exemplary embodiment of the present invention.

Next, the identification mark imparting device 70 according to a second modification is explained in conjunction with FIG. 14.

In this exemplary embodiment, an image forming unit 14 is used as an identification mark imparting device 70. That is, the image forming unit 14 forms an image constituting an identification mark 20*a* at a predetermined position of a paper 20 at the time of forming an image on a front surface of the paper 20, that is, on the surface which constitutes a first surface of the paper 20. Here, the image forming unit 14 forms the image constituting the identification mark 20*a* in a shape which clearly indicates the feeding direction, for example, an arrow shape shown in FIG. 6.

In forming the image which constitutes the identification mark using the image forming unit, to facilitate the identification of the identification mark by his/her sense of touch, toner may be applied to the paper with a large thickness or foamed toner which swells by heat may be used.

In the explanation of the identification mark imparting device 70 according to the second modification, the parts identical with the corresponding parts of the image forming apparatus of the first exemplary embodiment of the present invention are given same numerals and their explanation is omitted.

Figure 15:
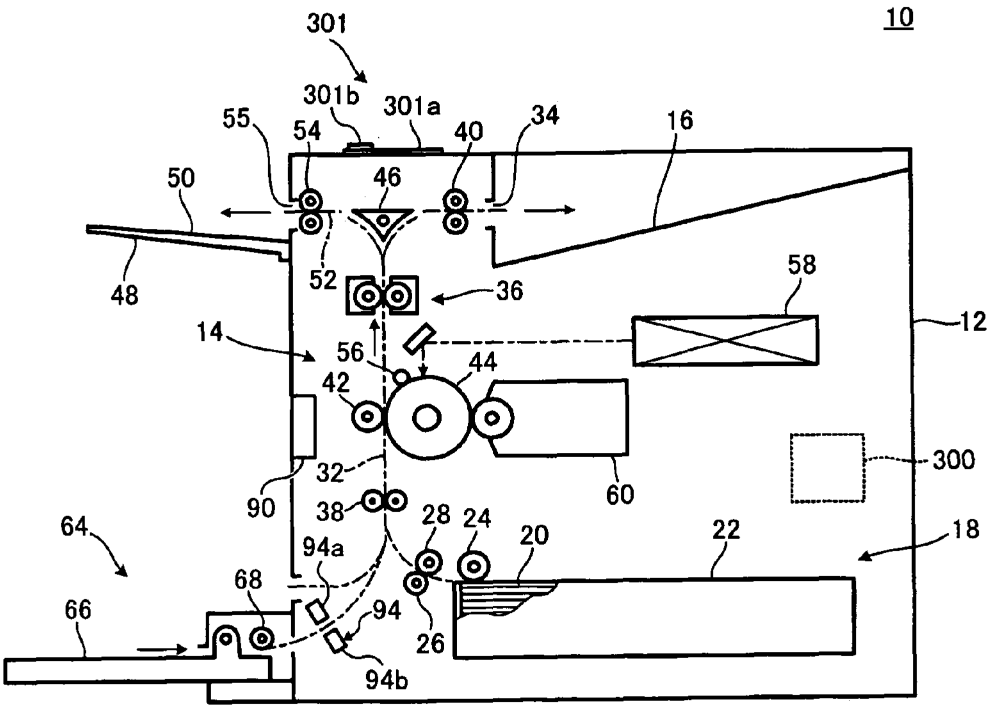
FIG. 15 is a side view showing an image forming apparatus according to a second exemplary embodiment of the present invention.

FIG. 15 shows an image forming apparatus 10 according to a second exemplary embodiment of the present invention.

The image forming apparatus 10 according to the second exemplary embodiment can, in addition to controls substantially equal to the respective controls performed in the above-mentioned image forming apparatus 10 according to the first exemplary embodiment, determine whether or not the paper 20 is set on the manual paper feeder 64 in the proper direction.

Further, the image forming apparatus 10 according to the second exemplary embodiment is provided with, in addition to the above-mentioned constitution of the image forming apparatus 10 according to the first exemplary embodiment, a detection device 94 which is arranged downstream of the feed roller 68 mounted on the manual tray 66 in the paper conveyance direction, for example. The detection device 94 includes a light emitting part 94*a* mounted on one side of the main conveyance path 32 and a light receiving part 94*b* mounted on another side of the main conveyance path 32, and is used as a detection unit that detects the identification mark 20*a* imparted to the paper 20 by the identification mark imparting device 70.

Figure 16:
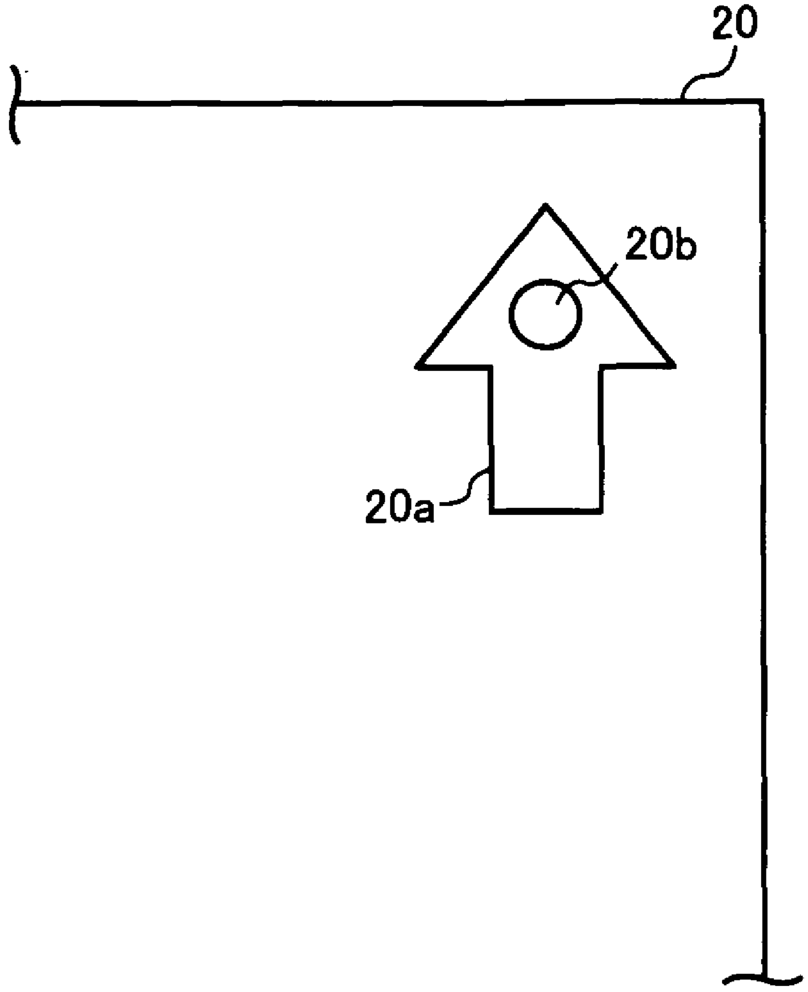
FIG. 16 is a view showing paper in which an identification mark and a through hole are formed by the image forming apparatus according to the second exemplary embodiment of the present invention.

That is, the identification mark imparting device 70 of the image forming apparatus 10 according to the second exemplary embodiment forms the identification mark 20*a* on the paper 20 in the same manner as the above-mentioned image forming apparatus 10 according to the first exemplary embodiment and, additionally, as shown in FIG. 16, forms a through hole 20*b* within the identification mark 20*a*. By detecting through hole 20*b* using the detection device 94, the identification mark 20*a* is indirectly detected by the detection device 94.

Figure 17:
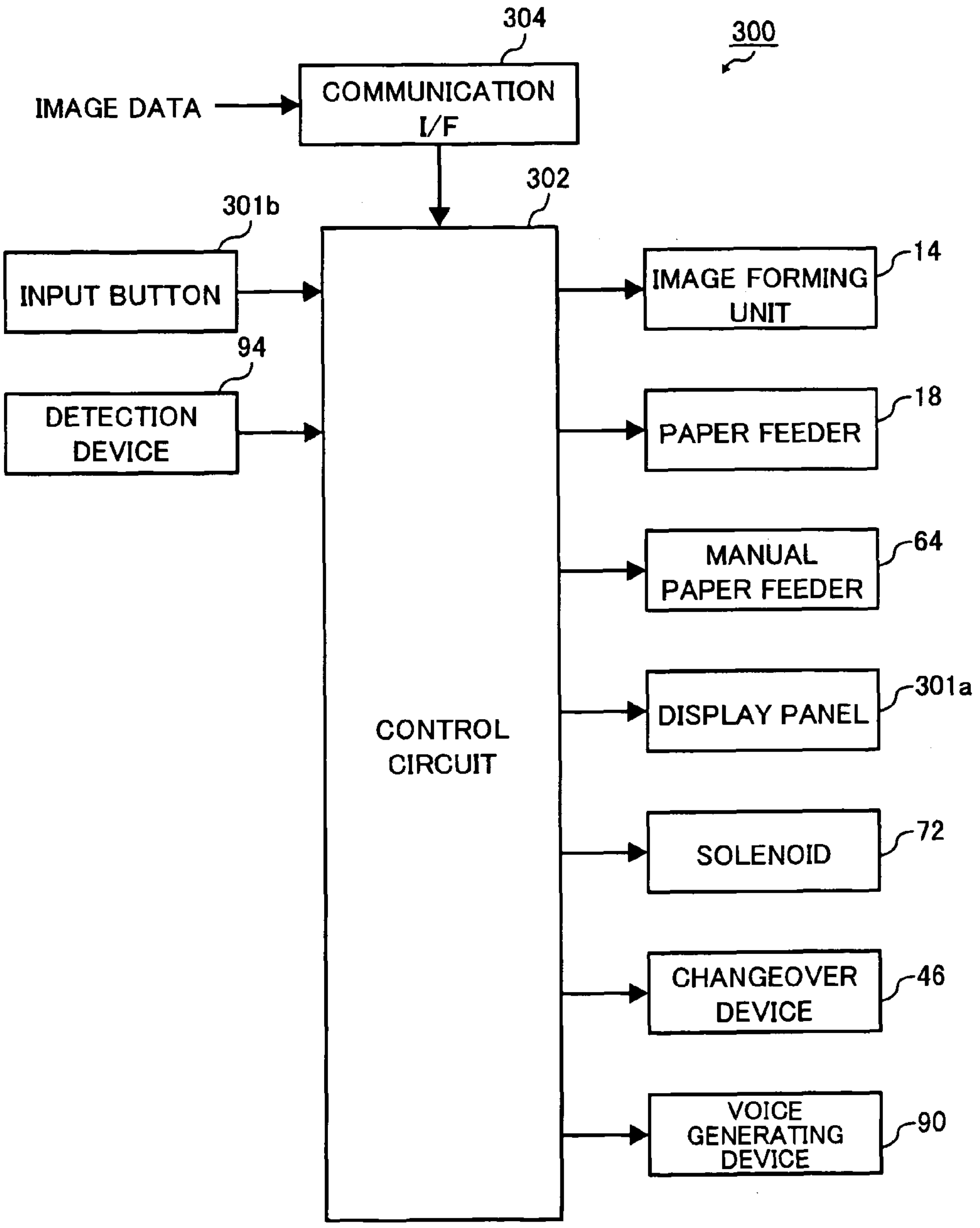
FIG. 17 is a block diagram showing a controller included in the image forming apparatus according to the second exemplary embodiment of the present invention.

FIG. 17 shows a controller 300 which the image forming apparatus 10 according to the second exemplary embodiment of the present invention includes. A control circuit 302 of the controller 300 according to the second exemplary embodiment receives an input from the detection device 94 in addition to input and output signals substantially equal to the corresponding signals used in the previously-mentioned first exemplary embodiment. In the second exemplary embodiment, the controller 300 is used as a determination unit that determines whether or not the re-feeding of the paper 20 on which the identification mark 20*a* is formed is properly performed by the operator based on a detection result of the detection device 94.

Figure 18:
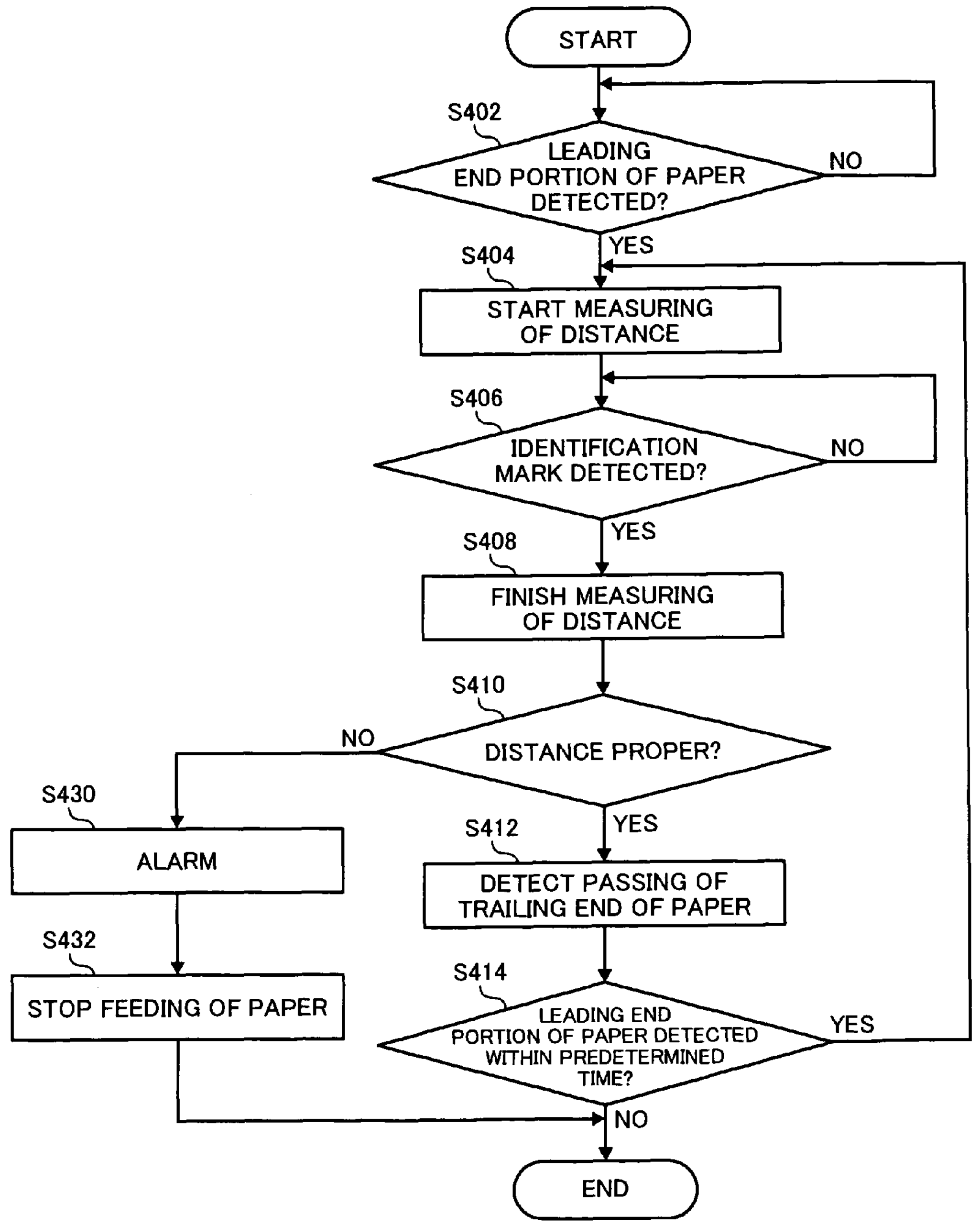
FIG. 18 is a flowchart for explaining printing processing by the controller included in the image forming apparatus according to the second exemplary embodiment of the present invention.

FIG. 18 shows a control flow when the controller 300 determines whether or not the re-feeding of the paper 20 on which the identification mark 20*a* is formed is properly performed.

As shown in FIG. 18, when the control is started, in step 402 (S402), the controller 300 waits for the detection of the leading end portion of the paper 20 by the detection device 94, and the controller 300 starts the measuring of the distance from the leading end portion of the paper 20 to the position where the identification mark 20*a* is formed on the paper 20.

In next step 406 (S406), the controller 300 waits for the detection of the identification mark 20*a* by the detection device 94, and in step 408 (S408), the controller 300 finishes the measuring of the distance and, at the same time, stores the measured distance from the leading end portion of the paper to the position where the identification mark 20*a* is formed.

In next step 410 (S410), the controller 300 determines whether or not the distance stored in step 408 is proper, that is, the distance stored in step 408 agrees with the distance from the leading end portion of the paper to the position where the identification mark 20*a* is formed when the paper is set to the manual tray 66 in the proper direction without misjudging front and back surfaces of the paper. For example, in performing the printing on the front surface of the paper, when the identification mark 20*a* is formed at a position shown in FIG. 4, it is determined whether or not the distance stored by the controller 300 in step 408 agrees with the distance L shown in FIG. 4. When the paper 20 is set in the manual tray 66 with misjudgment of the top-and-bottom direction or the up-side-down direction, the distance stored in the controller 300 in step 408 does not agree with the distance L shown in FIG. 4.

In step 410, when it is determined that the distance is the proper distance, the processing advances to next step 412, and when it is determined that the distance is not the proper distance, the processing advances to step 430 (S430).

In step 430 (S430), the controller 300 controls the voice generating device 90 and allows the voice generating device 90 to generate an alarm that the setting direction of paper on the tray is wrong. Then, in next step 432 (S432), the controller 300 stops the feeding of the next paper which is performed using the feed roller 68.

In step 412 (S412), after confirming that the trailing end portion of the paper 20 passes the position where the detection device 94 is arranged in response to a detection signal outputted from the detection device 94, in step 414 (S414), the controller 300 determines whether or not the leading end portion of the next paper is detected within a preset predetermined time after detection of passing of the trailing end of the paper in step 412. When it is determined that the leading end portion of the next paper is detected within the preset predetermined time, the processing returns to step 404, and when it is determined that the leading end portion of the next paper is not detected within the preset predetermined time, the controller 300 finishes the above-mentioned series of control.

Figure 19:
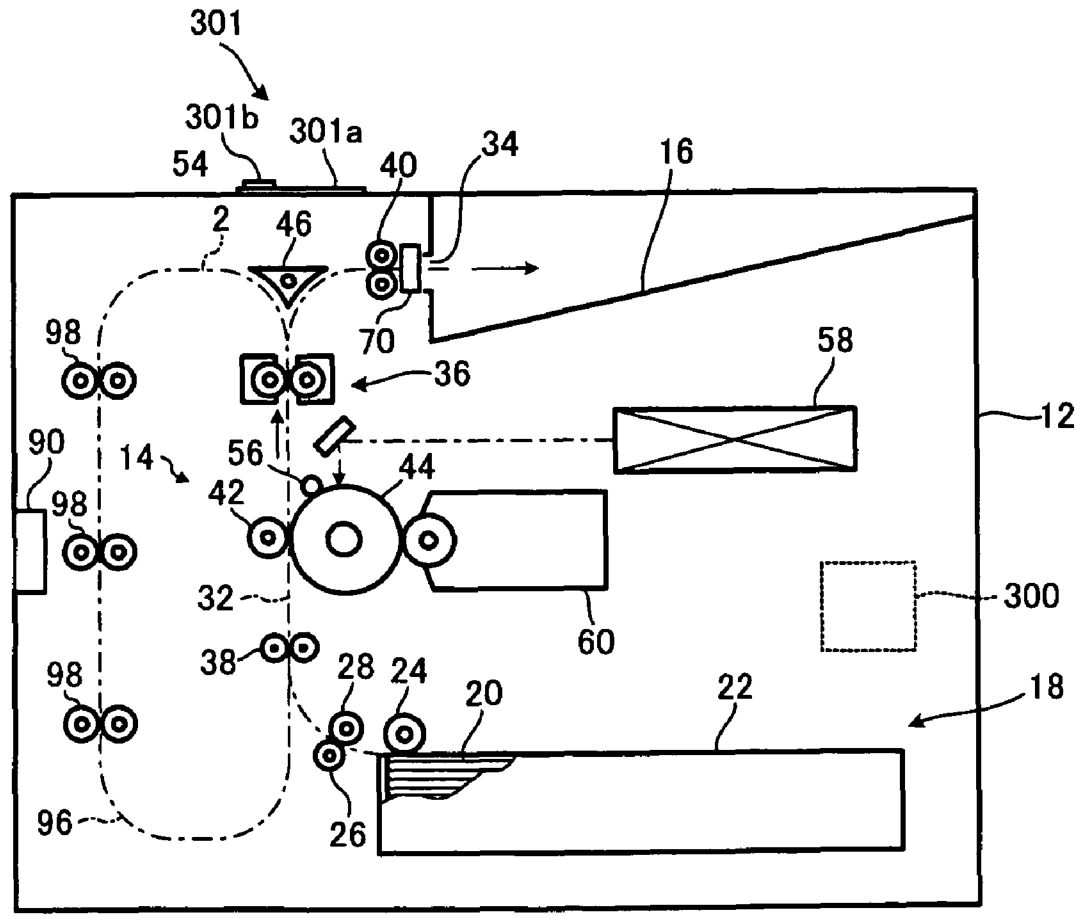
FIG. 19 is a side view showing an image forming apparatus according to a third exemplary embodiment of the present invention.

FIG. 19 shows an image forming apparatus 10 according to the third exemplary embodiment of the present invention.

The image forming apparatus 10 according to the third exemplary embodiment does not include the sub conveyance path 52, the discharge roller 54, the paper discharge portion 50, and the manual paper feeder 64 which are included in the above-mentioned image forming apparatus 10 according to the first exemplary embodiment and the above-mentioned image forming apparatus 10 according to the second exemplary embodiment. On the other hand, the image forming apparatus 10 according to the third exemplary embodiment arranges a reconveyance path 96 in the inside of the image forming apparatus body 12.

The reconveyance path 96 is a conveyance path used for conveying paper which forms an image on one surface thereof to the image forming part 14 again while reversing the paper. The reconveyance path 96 extends from the changeover device 46 to the registration roller 38 while wrapping around a side opposite to the image holder 44 with respect to the main conveyance path 32. For example, the reconveyance path 96 is provided with three reconveyance rollers 98, and the paper is conveyed in the reconveyance path 96 using these reconveyance rollers 96.

Further, in the above-mentioned first and second exemplary embodiments, the identification mark imparting device 70 is arranged in the vicinity of the discharge roller 54. On the other hand, in the image forming apparatus 10 according to the third exemplary embodiment, the identification mark imparting device 70 is arranged in the vicinity of the discharge roller 40.

Also in this third exemplary embodiment, in the same manner as the first exemplary embodiment and the second exemplary embodiment, the identification mark 20*a* is formed on the paper 20 by the identification mark imparting device 70. Further, the identification mark 20*a* is an identification mark which the operator can identify with his/her sense of touch, and the operator can identify a front surface or a back surface of the paper 20 based on the identification mark 20*a*.

Further, also in this third exemplary embodiment, the identification mark 20*a* is imparted to the paper for allowing the operator to identify a top portion or a bottom portion of the paper 20. With the provision of the identification mark 20*a*, the operator can identify the order of image formation when the image is formed on the plural sheets of paper 20. Especially, the identification mark 20*a* can be imparted to the respective plural sheets of paper 20 at positions different from each other corresponding to the order of image formation. Further, also in this third exemplary embodiment, the identification mark 20*a* is imparted for allowing the operator to identify kinds of image formed on the plural sheets of paper when the plural kinds of images different from each other are formed on the plural sheets of paper 20. Especially, the identification mark 20*a* can be respectively imparted to the plural sheets of paper 20 at positions different from each other corresponding to the kinds of images formed on these sheets paper.

The present invention is applicable to the image forming apparatus such as a printer, a copy machine or facsimile which, for example, requires the suppression of erroneous re-feeding of paper at the time of performing both-side printing.

The foregoing description of the exemplary embodiments of the present invention has been provided for the purposes of illustration and description. It is not intended to be exhaustive or to limit the invention to the precise forms disclosed obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an image forming unit; and an identification mark imparting unit that imparts an identification mark that is identifiable by a sense of touch on a recording paper on which an image is formed by the image forming unit, the identification mark having an arrow shape and being imparted onto different positions of the recording paper with respect to at least one of a width direction and a height direction of the recording paper, and wherein the identification mark imparting unit imparts an identification mark on a plurality of sheets of recording paper at a fixed incremental distance on each successive sheet with which an order of the image formation is identifiable by virtue of the fixed incremental distance between each respective identification mark when the image is formed on the plurality of sheets of recording paper.

2. The image forming apparatus according to claim 1, wherein the identification mark imparting unit imparts the identification mark with which a front and a back of the recording paper are identifiable.

3. The image forming apparatus according to claim 1, wherein when both-side printing is designated, the image forming apparatus performs printing on a first surface of the recording paper and performs printing on a second surface of the recording paper after an operator feeds the recording paper again.

4. The image forming apparatus according to claim 3, wherein the image forming apparatus further comprises:

a detection unit that detects the identification mark imparted by the identification mark imparting unit, and a determination unit that determines whether or not the re-feeding of the paper to which the identification mark is imparted is properly performed by an operator based on a detection result of the detection unit.

5. The image forming apparatus according to claim 4, wherein the image forming apparatus further comprises:

an alarm unit that gives a warning to the operator when the determination unit determines that the re-feeding of the paper is not performed properly by the operator.

6. The image forming apparatus according to claim 3, wherein the identification mark imparting unit imparts the identification mark on at least a portion of the recording paper at the time of performing printing on the first surface of the recording medium and does not impart the identification mark at the time of performing printing on the second surface.

7. The image forming apparatus according to claim 1, wherein the image forming apparatus further comprises:

a fixing unit that fixes the image formed by the image forming unit to the recording paper, and the identification mark imparting unit is arranged downstream of the fixing unit in the recording paper conveying direction.

8. The image forming apparatus according to claim 1, wherein the identification mark imparting unit further comprises:

an identification mark forming member which forms a recessed or projecting identification mark on at least a portion of the recording paper.

9. The image forming apparatus according to claim 1, wherein the image forming apparatus further comprises:

a discharge member that includes a rotary shaft and a body portion supported on the rotary shaft that discharges the recording paper to an outside of the image forming apparatus, and the identification mark imparting unit includes an identification mark forming member supported on the rotary shaft that forms a recessed or a projecting identification mark on at least a portion of the recording paper and a stopping unit that stops the identification mark forming member at predetermined timing.

10. The image forming apparatus according to claim 1, wherein the identification mark imparting unit imparts identification marks on a plurality of sheets of recording paper with which an order of the image formation is identifiable when the image is formed on the plurality of sheets of recording paper.

11. The image forming apparatus according to claim 10, wherein the identification mark imparting unit imparts the identification marks at respectively different positions of the plurality of sheets of recording paper corresponding to an order of the image formation.

12. The image forming apparatus according to claim 1, wherein the identification mark imparting unit imparts, when a plurality of kinds of images different from each other are formed on the plurality of sheets of recording paper, identification marks with which kinds of formed images are identifiable.

13. The image forming apparatus according to claim 12, wherein the identification mark imparting unit imparts the identification marks at respectively different positions of the sheets of paper on which the plurality of kinds of images different from each other are respectively formed corresponding to the kinds of formed images.

14. An image forming apparatus comprising:

an image forming unit; and an identification mark imparting unit that imparts a single identification mark which is identifiable by a sense of touch on a recording paper on which an image is formed and printed by the image forming unit, wherein the identification mark imparting unit imparts the identification mark at a different location on each of a plurality of sheets of recording paper such that an order of the plurality of sheets of recording paper is identifiable by the sense of touch when the image is printed on the plurality of sheets of recording paper and being imparted onto different positions of the recording paper with respect to at least one of a width direction and a height direction of the recording paper, and wherein the identification mark imparting unit imparts an identification mark on a plurality of sheets of recording paper at a fixed incremental distance on each successive sheet with which an order of the image formation is identifiable by virtue of the fixed incremental distance between each respective identification mark when the image is formed on the plurality of sheets of recording paper.

15. The image forming apparatus according to claim 1, wherein the identification mark imparting unit imparts the identification mark with which a top portion and a bottom portion of the recording paper is identifiable.

* * * * *